US012231862B2

(12) United States Patent
Jeong et al.

(10) Patent No.: US 12,231,862 B2
(45) Date of Patent: Feb. 18, 2025

(54) ELECTRONIC DEVICE INCLUDING MULTI-WAY SPEAKER AND OPERATION METHOD THEREOF

(71) Applicant: Samsung Electronics Co., Ltd., Suwon-si (KR)

(72) Inventors: Hyeonyeong Jeong, Suwon-si (KR); Haekeu Park, Suwon-si (KR); Juhee Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 17/961,039

(22) Filed: Oct. 6, 2022

(65) Prior Publication Data

US 2023/0087784 A1 Mar. 23, 2023

Related U.S. Application Data

(63) Continuation of application No. PCT/KR2022/013554, filed on Sep. 8, 2022.

(30) Foreign Application Priority Data

Sep. 13, 2021 (KR) ........................ 10-2021-0121983

(51) Int. Cl.
*G10K 11/16* (2006.01)
*H04R 3/04* (2006.01)

(52) U.S. Cl.
CPC ............... *H04R 3/04* (2013.01); *G10K 11/16* (2013.01)

(58) Field of Classification Search
CPC ................................. H04R 3/04; G10K 11/16
(Continued)

(56) References Cited

U.S. PATENT DOCUMENTS 7,957,543 B2 6/2011 Matthey
9,414,150 B2 8/2016 Hendrix et al.
(Continued)

FOREIGN PATENT DOCUMENTS

KR 10-1381289 B1 4/2014
KR 10-1473173 B1 12/2014
(Continued)

OTHER PUBLICATIONS

International Search Report with Written Opinion and English translation dated Dec. 16, 2022; International Appln. No. PCT/KR2022/013554.
(Continued)

*Primary Examiner* — Ammar T Hamid
(74) *Attorney, Agent, or Firm* — Jefferson IP Law, LLP

(57) ABSTRACT

An electronic device is provided. The electronic device includes a communication module, an input module, a first output module, a second output module, a first digital to analog converter (DAC) connected to the first output module, a second DAC connected to the second output module, and at least one processor, wherein the at least one processor may be configured to identify an operation mode of the electronic device, obtain an external signal through the communication module, or obtain an input signal through the input module, generate an output signal corresponding to the operation mode, and control the first DAC and the second DAC in response to the operation mode.

22 Claims, 13 Drawing Sheets

(58) Field of Classification Search
USPC ........................... 381/71, 81, 123, 71.1, 71.2
See application file for complete search history.

(56) References Cited

U.S. PATENT DOCUMENTS

| | | | | |
|---|---|---|---|---|
| 9,860,642 | B2 | 1/2018 | Rin et al. | |
| 10,347,233 | B2 | 7/2019 | Park et al. | |
| 10,741,164 | B1 | 8/2020 | Honda et al. | |
| 11,109,158 | B2 | 8/2021 | Cho et al. | |
| 2007/0005161 | A1 | 1/2007 | Henson et al. | |
| 2011/0033056 | A1 | 2/2011 | Johnson et al. | |
| 2014/0270222 | A1 | 9/2014 | Hendrix et al. | |
| 2016/0316291 | A1* | 10/2016 | Hendrix | H04R 3/12 |
| 2017/0013359 | A1* | 1/2017 | Rin | H04R 3/12 |
| 2017/0061980 | A1 | 3/2017 | Jang et al. | |
| 2021/0160618 | A1 | 5/2021 | Chun et al. | |

FOREIGN PATENT DOCUMENTS

| | | | |
|---|---|---|---|
| KR | 10-2017-0024315 | A | 3/2017 |
| KR | 10-2020-0000268 | A | 1/2020 |
| WO | 2014/158449 | A | 10/2014 |

OTHER PUBLICATIONS

Extended European Search Report dated Aug. 23, 2024, issued in European Application No. 22867738.1-1207.

* cited by examiner

ELECTRONIC DEVICE INCLUDING MULTI-WAY SPEAKER AND OPERATION METHOD THEREOF

CROSS-REFERENCE TO RELATED APPLICATION(S)

This application is a continuation application, claiming priority under § 365 (c), of an International application No. PCT/KR2022/013554, filed on Sep. 8, 2022, which is based on and claims the benefit of a Korean patent application number 10-2021-0121983, filed on Sep. 13, 2021, in the Korean Intellectual Property Office, the disclosure of which is incorporated by reference herein in its entirety.

TECHNICAL FIELD

The disclosure relates to an electronic device including a multi-way speaker and a method of operating the electronic device. More particularly, the disclosure relates to an electronic device including a multi-way speaker that controls speakers according to the operation mode of the electronic device, and a method of operating the electronic device.

BACKGROUND ART

Generally for speakers, there are a full-range method that reproduces the whole audio band with a single speaker, and a multi-way method that reproduces sounds of two or more different bands, such as treble and mid-bass, or treble, mid-range, and bass.

Here, the full-range method is mainly used in low-cost places, such as public address (PA) because it is difficult to cover the whole audible frequency band with one speaker and it is difficult to implement high-quality sound (HiFi), and multi-way speakers are generally used where high sound quality is required.

Meanwhile, in the multi-way speaker output method for a system with one digital to analog converter (DAC), an input audio signal is amplified with a power amplifier, and a driving signal is applied to a network circuit including resistor capacitor (RC) or resistor-inductor (RL) passive elements and distributed to separate frequency bands, and independently applied to high, mid, and low range speakers (tweeter, squawker, woofer) to drive the speakers, producing sound.

Meanwhile, audio output devices, such as headphones may be equipped with various noise canceling techniques. For example, headphones may obtain ambient noise through a microphone connected to the noise canceling circuit, and output an anti-noise signal of inverted phase relative to the obtained noise. The user hears both the ambient noise and the inverted phase noise, producing an effect of removing the noise.

When an audio output device utilizes an active noise cancellation (ANC) technique, it may obtain noise through a microphone for ANC and actively cancel noise by identifying the surrounding noise environment. The audio output device may be designed to cancel out ambient noise at the output unit (speaker) so that the audio signal from a playback device can be more clearly provided to the user.

The above information is presented as background information only to assist with an understanding of the disclosure. No determination has been made, and no assertion is made, as to whether any of the above might be applicable as prior art with regard to the disclosure.

DISCLOSURE

Technical Problem

In the case of an electronic device including a multi-way speaker, although the frequency bands managed by the woofer speaker and the tweeter speaker are different, they may be connected in parallel to one digital to analog converter (DAC). In this case, the electronic device may not be able to control the speaker for specific scenarios according to the signal to be output.

Generally, in an electronic device including a multi-way speaker, a peak component of the frequency response may exist in the frequency range of the tweeter speaker managing high frequencies. In the ANC technology, it is important for the electronic device to obtain a flat frequency response, and a peak component of the frequency response may cause deterioration of the ANC function. Specifically, the peak in the frequency range managed by the tweeter speaker is not included in the main band (e.g., ~2 k hertz (Hz)) where the ANC function is used but may cause an issue, such as howling when the ANC function is performed. Hence, the electronic device needs a method for removing the peak of the frequency response for the normal ANC operation.

On the other hand, when a filter is applied to the frequency to remove the peak of the frequency response, the frequency phase may be changed in the 2 kilohertz (kHz) or less band, which is the main ANC band. When the frequency phase is changed, performance loss may occur in the process of noise attenuation by anti-wave components with respect to the noise.

Aspects of the disclosure are to address at least the above-mentioned problems and/or disadvantages and to provide at least the advantages described below. Accordingly, an aspect of the disclosure is to provide an electronic device and a method for controlling the DAC to selectively utilize at least some speakers of the multi-way speaker.

Another aspect of the disclosure is to provide a method for enabling the electronic device to deactivate, in the multi-way speaker, a speaker (e.g., tweeter) managing the frequency range where a peak may occur, and selectively use a speaker (e.g., woofer) managing the frequency range required for the ANC function. According to various embodiments of the disclosure, it is possible to provide an electronic device that can improve ANC performance and reduce the current consumed by an unnecessary speaker.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module, an input module, a first output module, a second output module, a first DAC connected to the first output module, a second DAC connected to the second output module, and a processor, wherein the processor may be configured to identify an operation mode of the electronic device, obtain an external signal through the communication module, or obtain an input signal through the input module, generate an output signal corresponding to the operation mode, and control the first DAC and the second DAC in response to the operation mode.

In accordance with another aspect of the disclosure, a method of operating the electronic device is provided. The method includes identifying an operation mode of the electronic device, obtaining an external signal through a communication module or obtaining an input signal through an input module, generating an output signal corresponding to the operation mode, and controlling a first DAC connected to a first output module and a second DAC connected to a second output module in response to the operation mode.

Advantageous Effects

For example, the electronic device may provide an improved ANC function by removing a peak of the frequency response.

For example, the electronic device may use only a speaker, in the multi-way speaker, outputting a frequency band used by a specific function.

For example, the electronic device may increase the battery usage time by reducing unnecessary current consumption by deactivating an unnecessary speaker in the multi-way speaker.

For example, the electronic device may select a speaker to be used from the multi-way speaker according to the operation mode of the electronic device.

For example, the electronic device may use a speaker outputting a low frequency band in the multi-way speaker in response to active noise cancellation mode.

For example, the electronic device may use a speaker outputting a low frequency band in the multi-way speaker in response to call mode.

For example, the electronic device may use a speaker outputting a low frequency band in the multi-way speaker in response to voice guidance mode.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

Mode for Disclosure

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
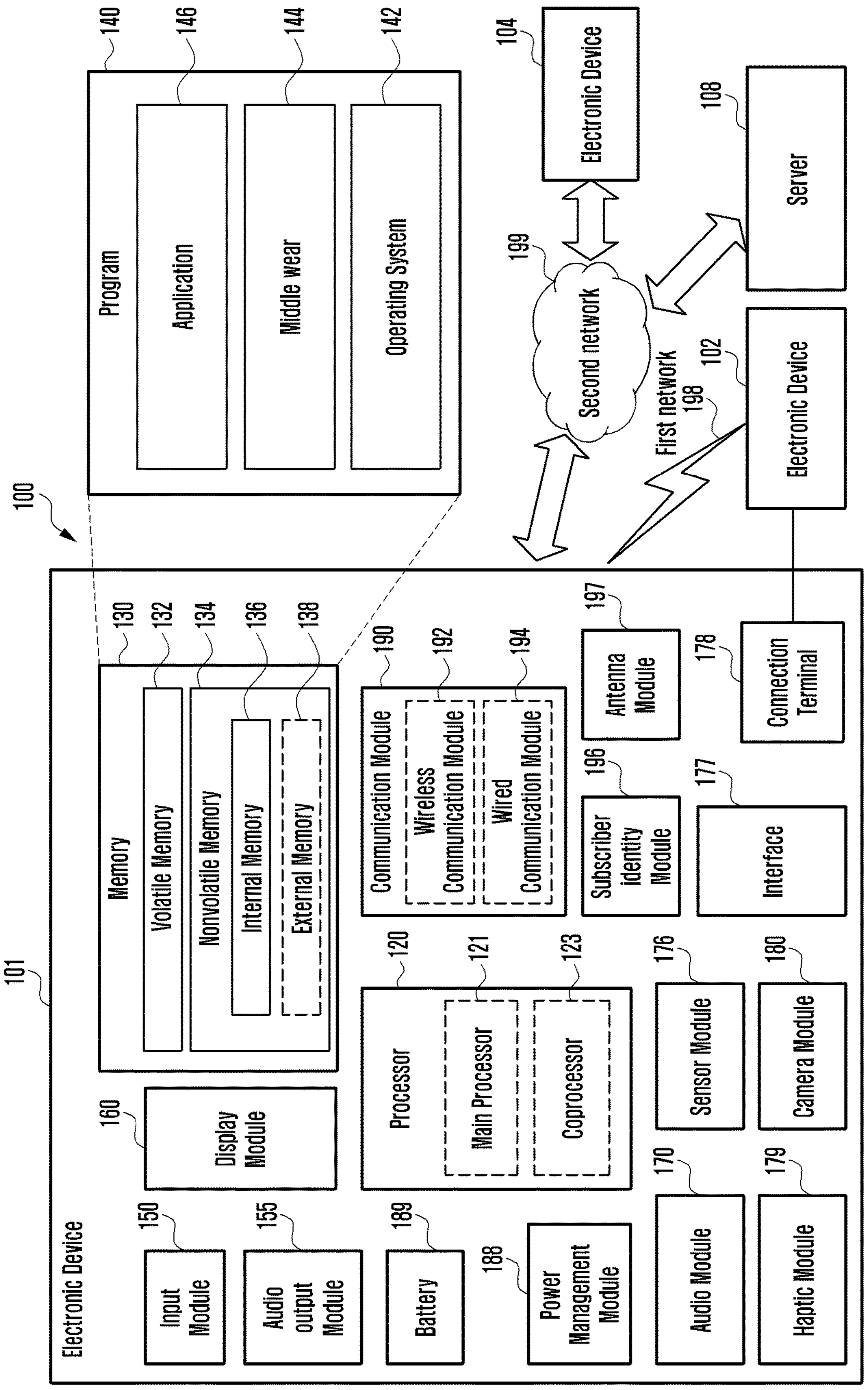
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
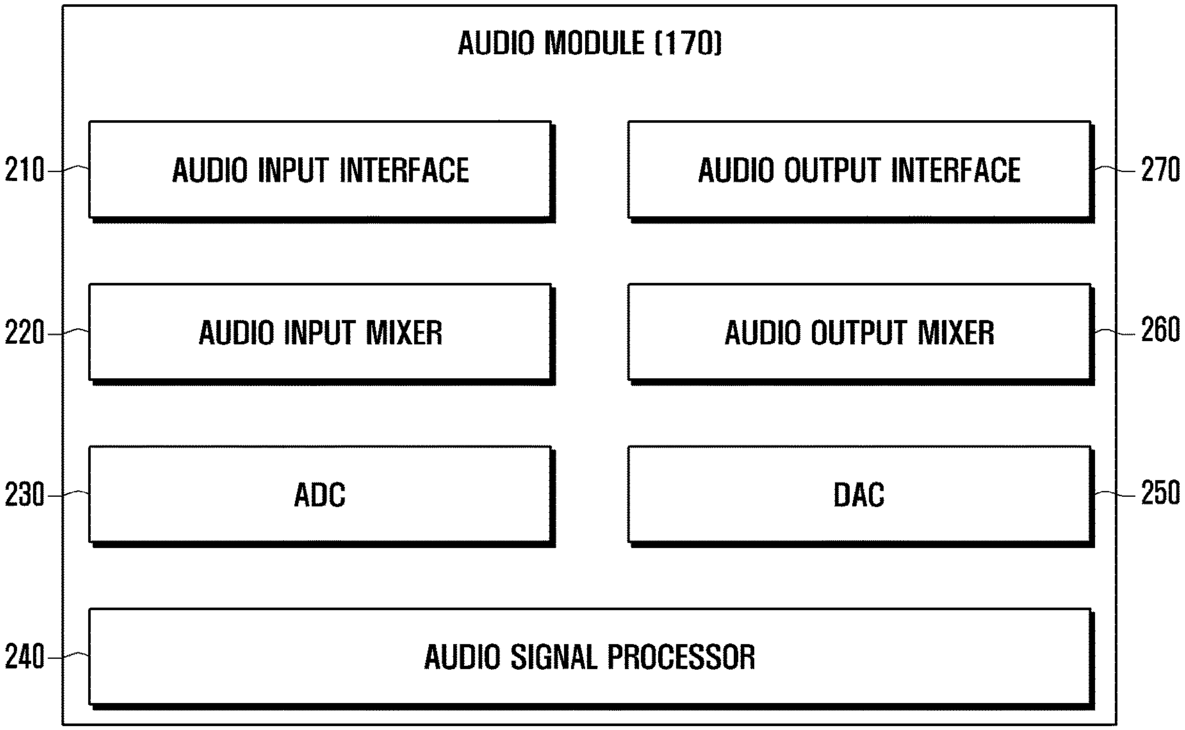
FIG. 2A is a block diagram of an audio module according to an embodiment of the disclosure.

FIG. 2*a* is a block diagram 200 illustrating the audio module 170 according to various embodiments. Referring to FIG. 2*a*, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor (120) or the memory (130)) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 2B:
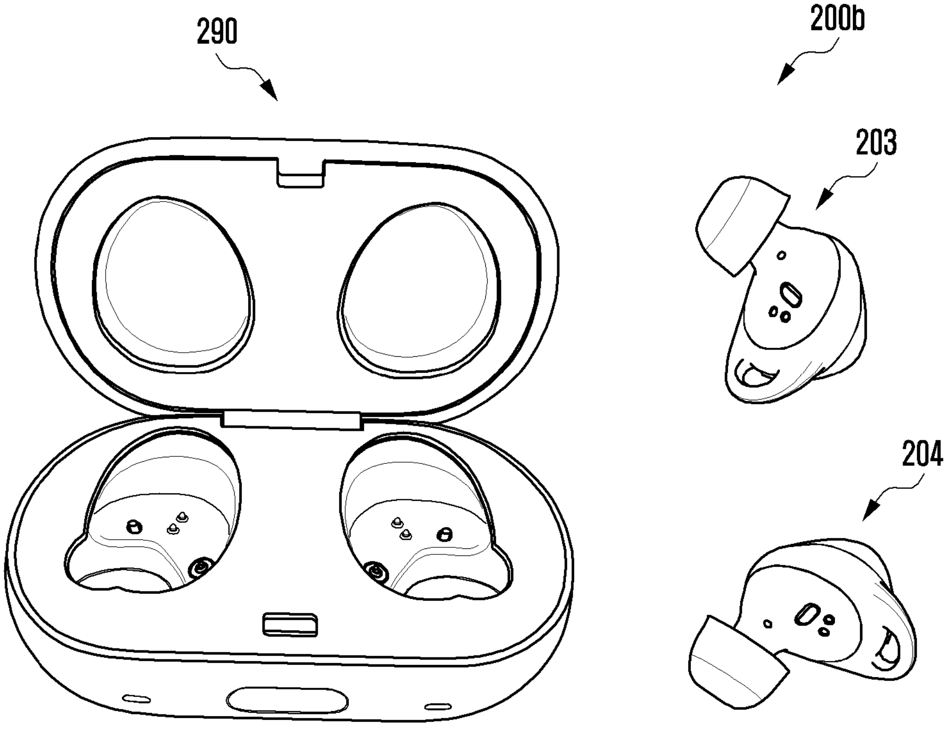
FIG. 2B is a configuration diagram of an electronic device according to an embodiment of the disclosure.

FIG. 2B is a diagram illustrating a configuration of an electronic device according to an embodiment of the disclosure.

Referring to FIG. 2B, an electronic device 200*b* (e.g., the electronic device 101 in FIG. 1) according to various embodiments of the disclosure may be a device that is wirelessly connected to an external electronic device (e.g., a smartphone) and is configured to output an audio signal received from the external electronic device through a speaker, or transmit an audio signal received through a microphone from the outside (e.g., a user) to the external electronic device. The electronic device 200*b* may include at least one of a first device 203, a second device 204, or a case 290.

The first device 203 and the second device 204 may be accommodated (or mounted) in the case 290 or may be separated (or detached) from the case 290. The first device 203 and the second device 204 may be respectively worn on body parts of the user (e.g., left ear or right ear of the user). The first device 203 and the second device 204 may each include a speaker or microphone. Each of the first device 203 and the second device 204 may output an audio signal through a speaker or receive (or input) an audio signal from the outside through a microphone. If the first device 203 and the second device 204 are detached from the case 290, power may be turned on and/or activated. When the first device 203 and the second device 204 are mounted on the case 290, the power of them may be turned off, charged, and/or deactivated (sleep).

According to various embodiments of the disclosure, the first device 203 may play a primary role, and the second device 204 may play a secondary role. Conversely, the first device 203 may play a secondary role, and the second device 204 may play a primary role. The first device 203 and the second device 204 may periodically or aperiodically transmit their detection information to the external electronic device.

The case 250 may include a housing having reception portions (or spaces) formed to accommodate (or receive) the first device 203 or the second device 204, and a cover attached to the housing. The reception portions may be formed to magnetically attract and retain the first device 203 or the second device 204 in the case 290. When the first device 203 and the second device 204 are mounted on the reception portions or the cover is closed, the case 290 may control the first device 203 and the second device 204 to be turned off or charged. When the first device 203 and the second device 204 are detached from the reception portions or the cover is opened, the case 290 may turn on the power of the first device 203 and the second device 204.

According to various embodiments of the disclosure, the electronic device **200*b* may include at least one sensor (not shown) (e.g., a wear detection sensor, motion a sensor, a touch sensor, or the like) and a communication module (not shown). According to an embodiment of the disclosure, at least one sensor may detect whether the electronic device 200*b* is worn on the user's body and a wearing posture. For example, the at least one sensor may include at least one of a proximity sensor or a grip sensor. According to an embodiment of the disclosure, the at least one sensor may detect an amount of change in posture caused by the user's movement. For example, the at least one sensor may include an acceleration sensor or a gyro sensor. The acceleration sensor may detect the acceleration with respect to the three axes, and the gyro sensor may detect the angular velocity with respect to the three axes. According to an embodiment of the disclosure, the at least one sensor may detect a gesture, such as a user's finger touch and a swipe action. In response to touch data detected by the at least one sensor, the electronic device 200*b*** may perform a control including at least one of music playback, stop, next music playback, and previous music playback or a combination thereof. According to an embodiment of the disclosure, the communication module may be a module that wirelessly communicates with the outside. The communication module may establish communication with another device and/or an access point (AP) through at least one of ultra wide band (UWB) module, Bluetooth (BT) network, Bluetooth low energy (BLE) network, wireless-fidelity (Wi-Fi) network, ANT+network, long-term evolution (LTE) network, 5th generation (5G) network, or narrowband Internet of things (NB-IoT) network, or a combination thereof.

Figure 3:
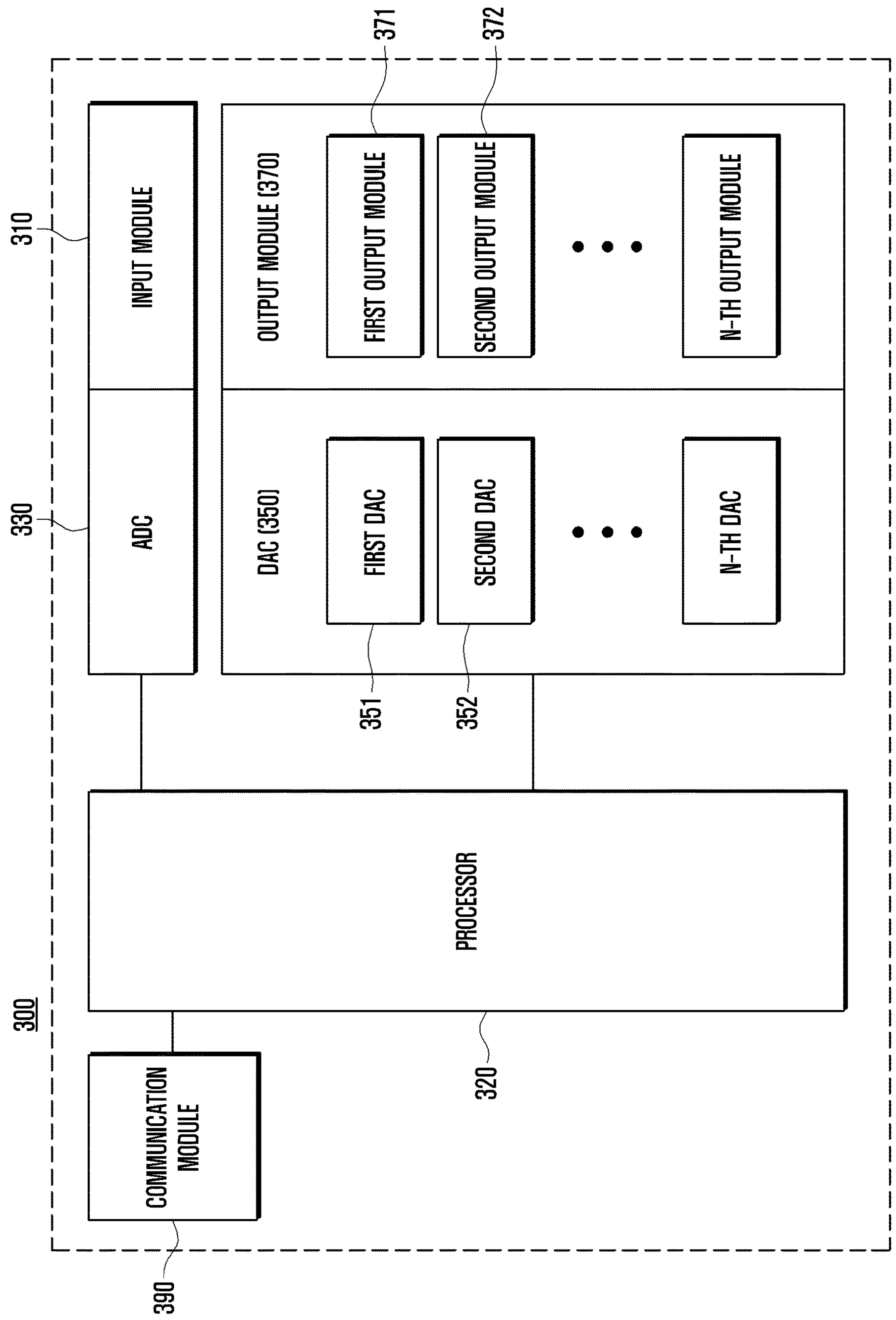
FIG. 3 is a block diagram of an electronic device according to an embodiment of the disclosure.

FIG. 3 is a block diagram of an electronic device according to an embodiment of the disclosure Referring to FIG. 3, an electronic device 300 (e.g., the electronic device 101 in FIG. 1 and/or electronic device **200*b* in FIG. 2B) may include a processor 320 (e.g., the processor 120 in FIG. 1), an input module 310 (e.g., the input module 150 in FIG. 1, an audio input interface 210 and/or audio input mixer 220 in FIG. 2A), a communication module 390 (e.g., the communication module 190 in FIG. 1), a DAC 350 (e.g., the DAC 250 in FIG. 2A), and an output module 370 (e.g., the audio output interface 270 and/or audio output mixer 260 in FIG. 2A). The components shown in FIG. 3 are some of the components included in the electronic device 300, and the electronic device 300 may also include various other components as illustrated in FIG. 1 or FIG. 2**A.

The input module 310 according to various embodiments may obtain an input signal corresponding to a sound from the outside of the electronic device 300.

The input module 310 according to an embodiment may include a microphone and obtain an input signal corresponding to an external sound outside the electronic device 300. For example, the external sound may include a sound generated in the vicinity of the user while the user is wearing the electronic device 300. For example, the external sound may include a user's voice. For example, the input module 310 may convert the obtained external sound (sound wave) into an electrical signal. For example, the input module 310 may convert an external sound being an acoustic signal into an electrical signal. For example, the input module 310 may be an input device, such as a microphone including a membrane (not shown) therein, and may obtain an input signal that is an electrical signal corresponding to vibrations of the membrane caused by an external sound.

The ADC 330 according to various embodiments may convert an analog input signal obtained by the input module 310 into a digital input signal. According to an embodiment of the disclosure, the input module 310 may be implemented to include the ADC 330 therein.

According to an embodiment of the disclosure, the ADC 330 may digitize an analog input signal. For example, the ADC 330 may convert an analog signal into a digital signal. For example, the ADC 330 may generate a digital input signal through a process where an analog input signal is sampled at uniform intervals, quantized to representative values of the intervals, and encoded in a digital binary code.

The communication module 390 according to various embodiments may communicate with an external electronic device (e.g., a smartphone) through a network (e.g., the first network 198 and/or the second network 199 in FIG. 1) and/or with a pair electronic device (e.g., the other earphone unit) to receive and/or transmit various information. For example, the communication module 390 may be connected to an external electronic device and/or a pair electronic device by using short-range network communication (e.g., Bluetooth™, Wi-Fi, or the like).

The communication module 390 according to an embodiment of the disclosure may include an antenna (not shown), and may receive and/or transmit a signal from and/or to an external electronic device and/or a pair electronic device through the antenna.

The communication module 390 according to an embodiment may obtain an external signal in an audio form from an external electronic device. For example, in second mode (e.g., a call mode), the communication module 390 may obtain an external signal corresponding to the voice of a call counterpart from the external electronic device. For example, in third mode (e.g., a multimedia playback mode), the communication module 390 may obtain an external signal corresponding to multimedia audio from the external electronic device. For example, in fourth mode (e.g., a voice guidance mode), the communication module 390 may obtain an external signal corresponding to voice guidance from the external electronic device.

The communication module 390 according to an embodiment may transmit an input signal obtained from the input module 310 to an external electronic device. For example, in second mode (e.g., a call mode), the communication module 390 may transmit an input signal corresponding to a call conversation of the user obtained through the input module 310 to the external electronic device. For example, in fourth mode (e.g., a voice guidance mode), the communication module 390 may transmit an input signal corresponding to a user's voice command obtained through the input module 310 to the external electronic device.

The communication module 390 according to an embodiment may be connected to a pair electronic device to transmit and/or receive various types of commands.

The DAC 350 according to various embodiments may convert a digital output signal from the processor 320 into an analog output signal.

The DAC 350 according to an embodiment may include an amplifier (Amp, not shown), and may amplify and process a signal obtained from the processor 320.

The DAC 350 according to an embodiment may include a plurality of DAC modules including a first DAC 351 and/or a second DAC 352. For example, the DAC 350 may include one or more DAC modules in addition to the first DAC 351 and/or second DAC 352. For example, the DAC 350 may include an n-th DAC. The n-th DAC indicates an n-th DAC included in the electronic device 300, 'n' may indicate a value less than or equal to the number of DACs included in the electronic device 300, and the value of 'n' may be determined according to the design of the electronic device 300.

The first DAC 351 according to an embodiment may be connected to a first output module 371 to output the converted analog output signal through the first output module 371. The second DAC 352 according to an embodiment may be connected to a second output module 372 to output the converted analog output signal through the second output module 372.

The output module 370 according to various embodiments may include a speaker and output an analog output signal to the outside of the electronic device 300.

The output module 370 according to various embodiments may include a plurality of output modules including a first output module 371 and/or a second output module 372. For example, the output module 370 may include one or more output modules in addition to the first output module 371 and/or the second output module 372. For example, the output module 370 may include an n-th output module. The n-th output module indicates an output module included in the electronic device 300 that is connected to the n-th DAC and outputs an output signal processed by the n-th DAC to the outside, 'n' may indicate a value less than or equal to the number of output modules included in the electronic device 300, and the value of 'n' may be determined according to the design of the electronic device 300.

According to various embodiments of the disclosure, the first output module 371 and/or the second output module 372 may each include a speaker, such as dynamic driver, balanced armature driver, and/or piezoelectric speaker, or a receiver.

The first output module 371 according to an embodiment may output an analog output signal converted through the first DAC 351 to the outside of the electronic device 300. The second output module 372 according to an embodiment may output an analog output signal converted through the second DAC 352 to the outside of the electronic device 300.

According to various embodiments of the disclosure, the first output module 371 and/or the second output module 372 may output signals of different frequency bands. For example, the first output module 371 may output a signal of a frequency band lower than a first cutoff (e.g., 9 kHz). For example, the second output module 372 may output a signal of a frequency band higher than or equal to the first cutoff (e.g., 9 kHz) and lower than a second cutoff (e.g., 20 kHz). For example, the first output module 371 and/or the second output module 372 may be speakers having different main output frequency bands, such as woofer speaker, mid-way speaker, or tweeter speaker.

According to various embodiments of the disclosure, the processor 320 may determine the operation mode based on information obtained through the communication module 390.

For example, the processor 320 may determine the operation mode to be the first mode (e.g., an active noise cancelling mode) in response to satisfaction of a specified condition (e.g., when active noise cancelling mode is activated, the user wears the electronic device, and information is not received from an external electronic device through the communication module, or when active noise cancelling mode is activated and the electronic device is outside the case (e.g., the case 290 in FIG. 2B)). For example, the processor 320 may determine the operation mode to be the second mode (e.g., a call mode) in response to receiving information related to the call mode from the external electronic device through the communication module 390. For example, the processor 320 may determine the operation mode to be the third mode (e.g., a multimedia playback mode) in response to obtaining information related to the multimedia playback mode from the external electronic device through the communication module 390. For example, the processor 320 may determine the operation mode to be the fourth mode (e.g., a voice guidance mode) in response to obtaining information related to the voice guidance mode from the external electronic device through the communication module 390.

According to an embodiment of the disclosure, the second mode, the third mode, and/or the fourth mode may include a state in which the first mode (e.g., an active noise cancelling mode) is activated or deactivated.

The processor 320 according to various embodiments of the disclosure may obtain an input signal. According to an embodiment of the disclosure, the processor 320 may obtain an input signal through the input module 310 and the ADC 330. For example, the processor 320 may obtain, as an input signal, a digital signal converted by the ADC 330 from an analog signal corresponding to an external sound of the electronic device 300 obtained by the input module 310.

The processor 320 according to an embodiment may convert an input signal, which is a signal in the time domain, into a frequency domain signal. For example, the processor 320 may generate a frequency domain input signal by performing fast Fourier transform (FFT) on the input signal, and generate an output signal by using the frequency domain input signal.

The processor 320 according to various embodiments may obtain an external signal in audio form from an external electronic device through the communication module 390. For example, the processor 320 may include an equalizer filter (EQ filter) and/or an audio effector, and may apply the external signal to the EQ filter according to settings.

According to various embodiments of the disclosure, the processor 320 may generate an output signal.

According to an embodiment of the disclosure, the processor 320 may generate at least one digital audio signal by synthesizing a plurality of digital audio signals.

According to an embodiment of the disclosure, the processor 320 may generate a first output signal based on an input signal in response to the operation mode being the first mode. For example, based on the input signal including noise, the processor 320 may generate a first output signal including a destructive interference signal from which the noise signal is to be canceled out. For example, the processor 320 may generate, as a first output signal, an anti-noise signal of inverted phase relative to the noise signal so that the noise signal can be canceled out.

According to an embodiment of the disclosure, in response to the operation mode being the second mode, the processor 320 may generate a second output signal based on an external signal. For example, the processor 320 may generate a second output signal including a voice signal of the other party of the call obtained through the communication module 390.

According to an embodiment of the disclosure, in response to the operation mode being the third mode, the processor 320 may generate a third output signal based on an input signal and an external signal. For example, the processor 320 may generate a third output signal including a destructive interference wave based on an input signal for cancelling out the input signal, and a multimedia audio signal obtained through the communication module 390. For example, the processor 320 may generate a third output signal by synthesizing an inverted phase signal of the input signal capable of canceling the output signal and a multimedia audio signal.

According to an embodiment of the disclosure, in response to the operation mode being the fourth mode, the processor 320 may generate a fourth output signal based on an external signal. For example, the processor 320 may generate a fourth output signal including a voice guidance signal obtained through the communication module 390.

The processor 320 according to various embodiments may control the DAC 350 to output a signal.

The processor 320 according to an embodiment may determine a module of the DAC 350 to be used according to the frequency range of the output signal. For example, the first DAC 351, the second DAC 352, and/or the n-th DAC may be controlled according to the frequency of the output signal. For example, the processor 320 may control the first DAC 351 to output a signal to the first output module 371 in response to the frequency of a signal to be output being lower than a first cutoff (e.g., 9 kHz). For example, the processor 320 may control the second DAC 352 to output a signal to the second output module 372 in response to the frequency of a signal to be output being higher than or equal to the first cutoff (e.g., 9 kHz) and lower than a second cutoff (e.g., 20 kHz). For example, the processor 320 may control the n-th DAC to output a signal to the n-th output module in response to the frequency of a signal to be output being higher than or equal to the (n−1)-th cutoff and lower than the n-th cutoff.

The processor 320 according to an embodiment of the disclosure may control the DAC 350 in response to the operation mode.

According to an embodiment of the disclosure, for the frequency range of the output signal generated in response to the operation mode, if the frequency range reproducible by an output module contains the frequency range of the output signal, the processor 320 may activate the DAC connected to the corresponding output module, if the frequency range reproducible by an output module does not contain the frequency range of the output signal, the processor 320 may deactivate the DAC connected to the corresponding output module.

For example, in response to the operation mode being the first mode (e.g., an active noise cancelling mode), the processor 320 may transmit a digital output signal to the first DAC 351 to allow the first output module 371 to output an analog output signal, and control the DAC 350 to deactivate the second to n-th DACs. As another example, in response to the operation mode being the first mode (e.g., an active noise cancelling mode), the processor 320 may transmit a first digital output signal lower than the first cutoff to the first DAC 351 to allow the first output module 371 to output a first analog output signal lower than the first cutoff, transmit a first digital output signal higher than or equal to the first cutoff and lower than the second cutoff to the second DAC 352 to allow the second output module 372 to output a first analog output signal higher than or equal to the first cutoff and lower than the second cutoff, and control the DAC 350 to deactivate the n-th DAC.

For example, in response to the operation mode being the second mode (e.g., a call mode), the processor 320 may transmit a digital output signal to the first DAC 351 to allow the first output module 371 to output an analog output signal, and control the DAC 350 to deactivate the second DAC 352.

For example, in response to the operation mode being the third mode (e.g., a multimedia playback mode), the processor 320 may transmit a digital output signal lower than the first cutoff to the first DAC 351 to allow the first output module 371 to output an analog output signal lower than the first cutoff, and transmit a digital output signal higher than or equal to the first cutoff to the second DAC 352 so as to control the DAC 350 to allow the second output module 372 to output an analog output signal higher than or equal to the first cutoff.

For example, in response to the operation mode being the fourth mode (e.g., a voice guidance mode), the processor 320 may transmit a digital output signal to the first DAC 351 to allow the first output module 371 to output an analog output signal, and control the DAC 350 to deactivate the second DAC 352.

Figure 4:
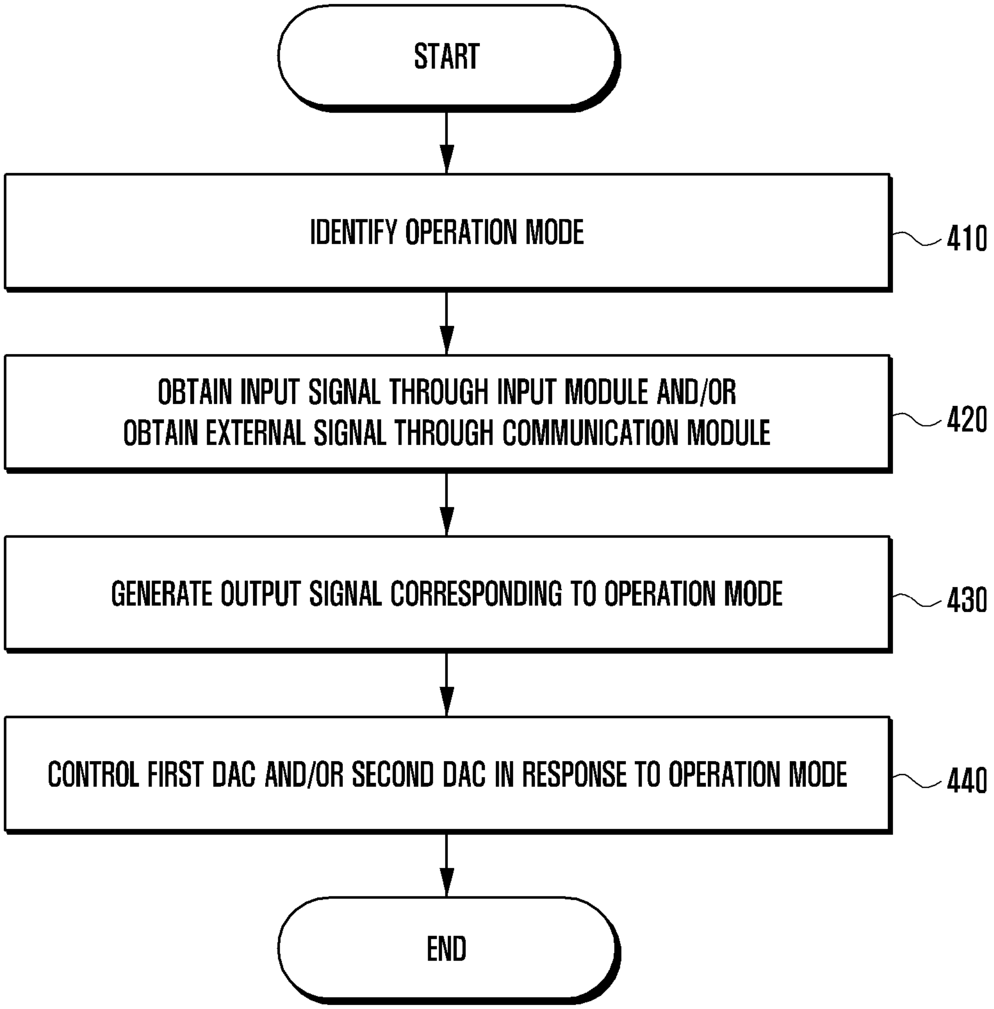
FIG. 4 is a flowchart illustrating a method for a processor to control a digital to analog converter (DAC) in response to an operation mode according to an embodiment of the disclosure.

FIG. 4 is a flowchart illustrating a method for a processor to control a DAC in response to an operation mode according to an embodiment of the disclosure.

Referring to FIG. 4, according to various embodiments of the disclosure, at operation 410, the processor 320 may identify the operation mode.

According to an embodiment of the disclosure, the processor 320 may identify the operation mode based on information obtained through the communication module (e.g., the communication module 390 in FIG. 3).

For example, the processor 320 may determine the operation mode to be the first mode (e.g., an active noise cancelling mode) in response to satisfaction of a specified condition (e.g., when active noise cancelling mode is activated, the user wears the electronic device, and information is not received from an external electronic device through the communication module, or when active noise cancelling mode is activated and the electronic device is outside the case (e.g., the case 290 in FIG. 2B)). For example, the processor 320 may determine the operation mode to be the second mode (e.g., a call mode) in response to receiving information related to the call mode from the external electronic device through the communication module 390.

For example, the processor 320 may determine the operation mode to be the third mode (e.g., a multimedia playback mode) in response to obtaining information related to the multimedia playback mode from the external electronic device through the communication module 390. For example, the processor 320 may determine the operation mode to be the fourth mode (e.g., a voice guidance mode) in response to obtaining information related to the voice guidance mode from the external electronic device through the communication module 390.

According to an embodiment of the disclosure, the second mode, the third mode, and/or the fourth mode may include a state in which the active noise cancelling mode is activated or deactivated.

According to various embodiments of the disclosure, at operation 420, the processor 320 may obtain an input signal through the input module 310 and/or obtain an external signal through the communication module 390.

According to an embodiment of the disclosure, the processor 320 may obtain an input signal through the input module 310 and the ADC 330. For example, the processor 320 may obtain, as an input signal, a digital signal converted by the ADC 330 from an analog signal corresponding to an external sound of the electronic device 300 obtained by the input module 310.

For example, the input module 310 may include a microphone and obtain an input signal corresponding to an external sound outside the electronic device 300. For example, the external sound may include a sound generated in the vicinity of the user while the user is wearing the electronic device 300. For example, the external sound may include a user's voice. For example, the input module 310 may convert the obtained external sound (sound wave) into an electrical signal. For example, the input module 310 may convert an external sound being an acoustic signal into an electrical signal. For example, the input module 310 may be an input device, such as a microphone including a membrane (not shown) therein, and may obtain an input signal that is an electrical signal corresponding to vibrations of the membrane caused by an external sound.

For example, the ADC 330 may convert an analog input signal obtained by the input module 310 into a digital input signal. For example, the ADC 330 may convert an analog signal into a digital signal. For example, the ADC 330 may generate a digital input signal through a process where an analog input signal is sampled at uniform intervals, quantized to representative values of the intervals, and encoded in a digital binary code.

According to an embodiment of the disclosure, the processor 320 may obtain an external signal in an audio form from an external electronic device through the communication module 390. For example, in second mode (e.g., a call mode), the communication module 390 may obtain an external signal corresponding to the voice of a call counterpart from the external electronic device. For example, in third mode (e.g., a multimedia playback mode), the communication module 390 may obtain an external signal corresponding to multimedia audio from the external electronic device. For example, in fourth mode (e.g., a voice guidance mode), the communication module 390 may obtain an external signal corresponding to voice guidance from the external electronic device.

According to various embodiments of the disclosure, at operation 430, the processor 320 may generate an output signal corresponding to the operation mode.

According to an embodiment of the disclosure, the processor 320 may generate a first output signal based on an input signal in response to the operation mode being the first mode. For example, based on the input signal including noise, the processor 320 may generate a first output signal including a destructive interference signal from which the noise signal is to be canceled out. For example, the processor 320 may generate, as a first output signal, an anti-noise signal of inverted phase relative to the noise signal so that the noise signal can be canceled out.

According to an embodiment of the disclosure, in response to the operation mode being the second mode, the processor 320 may generate a second output signal based on an external signal. For example, the processor 320 may generate a second output signal including a voice signal of the other party of the call obtained through the communication module 390.

According to an embodiment of the disclosure, in response to the operation mode being the third mode, the processor 320 may generate a third output signal based on an input signal and an external signal. For example, the processor 320 may generate a third output signal including a destructive interference wave based on an input signal for cancelling out the input signal, and a multimedia audio signal obtained through the communication module 390. For example, the processor 320 may generate a third output signal by synthesizing an inverted phase signal of the input signal capable of canceling the output signal and a multimedia audio signal.

According to an embodiment of the disclosure, in response to the operation mode being the fourth mode, the processor 320 may generate a fourth output signal based on an external signal. For example, the processor 320 may generate a fourth output signal including a voice guidance signal obtained through the communication module 390.

According to various embodiments of the disclosure, at operation 440, the processor 320 may control the DAC 350 in accordance with the operation mode.

According to an embodiment of the disclosure, for the frequency range of the output signal generated in response to the operation mode, if the frequency range reproducible by an output module contains the frequency range of the output signal, the processor 320 may activate the DAC connected to the corresponding output module, if the frequency range reproducible by an output module does not contain the frequency range of the output signal, the processor 320 may deactivate the DAC connected to the corresponding output module.

For example, in response to the operation mode being the first mode (e.g., an active noise cancelling mode), the processor 320 may transmit a first digital output signal to the first DAC 351 to allow the first output module 371 to output a first analog output signal, and control the DAC 350 to deactivate the second to n-th DACs.

As another example, in response to the operation mode being the first mode (e.g., an active noise cancelling mode), the processor 320 may transmit a first digital output signal lower than the first cutoff to the first DAC 351 to allow the first output module 371 to output a first analog output signal lower than the first cutoff, transmit a first digital output signal higher than or equal to the first cutoff and lower than the second cutoff to the second DAC 352 to allow the second output module 372 to output a first analog output signal higher than or equal to the first cutoff and lower than the second cutoff, and control the DAC 350 to deactivate the n-th DAC.

For example, in response to the operation mode being the second mode (e.g., a call mode), the processor 320 may transmit a second digital output signal to the first DAC 351 to allow the first output module 371 to output a second analog output signal, and control the DAC 350 to deactivate the second DAC 352.

For example, in response to the operation mode being the third mode (e.g., a multimedia playback mode), the processor 320 may transmit a third digital output signal lower than the first cutoff to the first DAC 351 to allow the first output module 371 to output a third analog output signal lower than the first cutoff, and transmit a third digital output signal higher than or equal to the first cutoff to the second DAC 352 so as to control the DAC 350 to allow the second output module 372 to output a third analog output signal higher than or equal to the first cutoff.

For example, in response to the operation mode being the fourth mode (e.g., a voice guidance mode), the processor 320 may transmit a fourth digital output signal to the first DAC 351 to allow the first output module 371 to output a fourth analog output signal, and control the DAC 350 to deactivate the second DAC 352.

Figure 5:
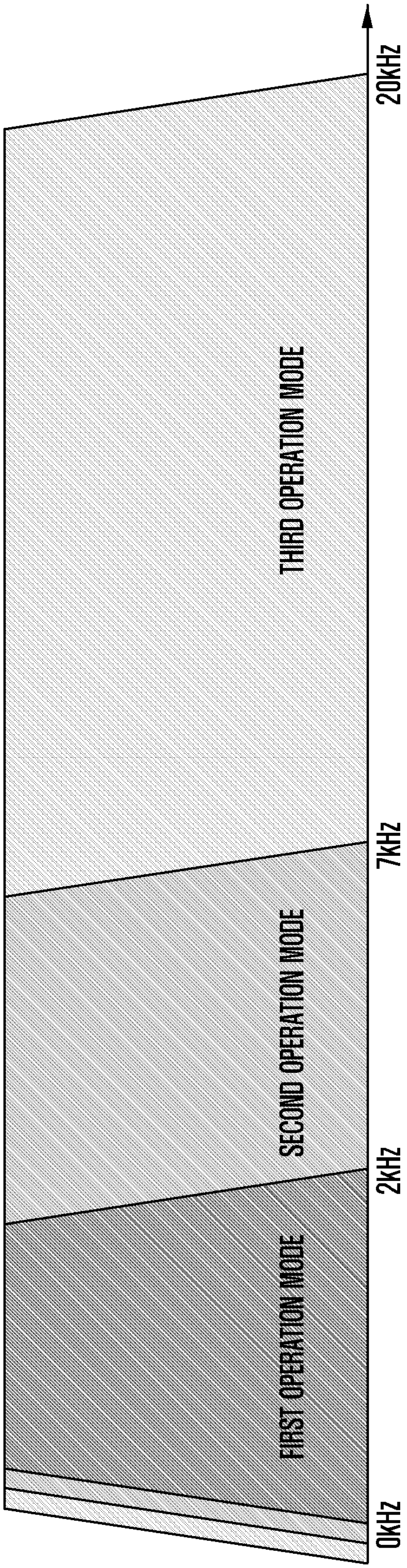
FIG. 5 is a diagram illustrating a frequency band of an output signal corresponding to an operation mode according to an embodiment of the disclosure.

FIG. 5 is a diagram illustrating a frequency band of an output signal corresponding to an operation mode according to an embodiment of the disclosure.

Referring to FIG. 5, according to various embodiments of the disclosure, the frequency band of an output signal may be different according to the operation mode. For example, in the first operation mode (e.g., an active noise cancelling mode), the main frequency band of the output signal may be in the range of 0 Hz to 2 kHz. For example, in the second operation mode (e.g., a call mode), the main frequency band of the output signal may be in the range of 300 Hz to 3400 Hz in the case of a narrow band (NB) and in the range of 500 Hz to 7000 Hz in the case of a wide band (WD). For example, in the third operation mode (e.g., a multimedia playback mode), the main frequency band of the output signal may be in the range of 20 Hz to 20 KHz.

For example, in the case of the first operation mode and/or the second operation mode, the main frequency range of the output signal may be contained in the output frequency band (e.g., 0 kHz to 9 kHz) of the first output module (e.g., the first output module 371 in FIG. 3). Hence, in the case of the first operation mode and/or the second operation mode, the processor (e.g., the processor 320 in FIG. 3) may control the DAC (e.g., the DAC 350 in FIG. 3) to output an output signal to the first DAC 351 and deactivate the second DAC (e.g., the second DAC 352 in FIG. 3).

FIGS. 6A, 6B, 6C, 6D and 6E are diagrams illustrating an operation of a processor to control a DAC in response to an operation mode according to various embodiments of the disclosure.

Figure 6A:
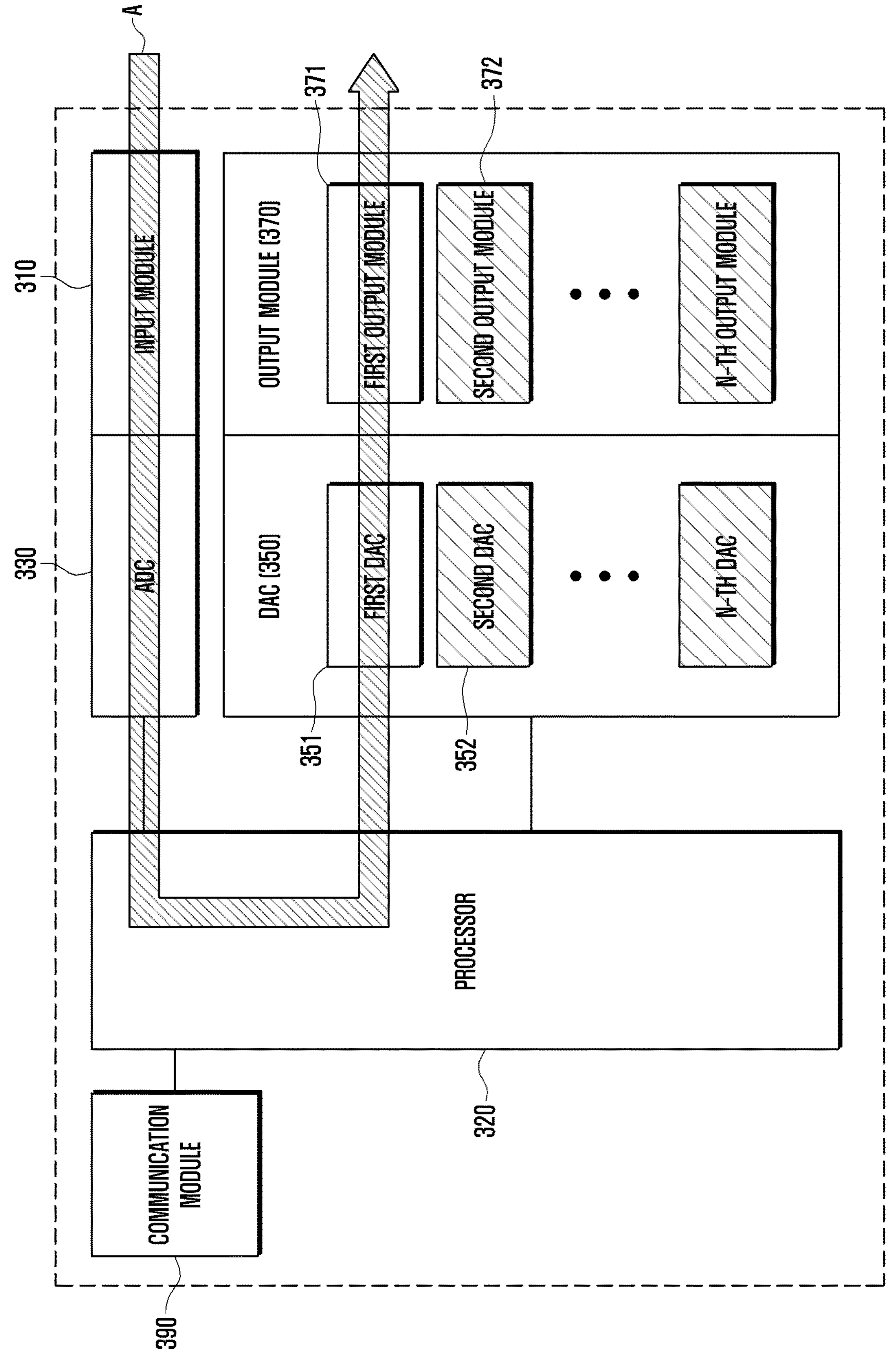
FIGS. 6A, 6B, 6C, 6D, and 6E are diagrams illustrating an operation of a processor to control a DAC in response to an operation mode according to various embodiments of the disclosure.

FIG. 6A is a diagram illustrating an operation of a processor to control a DAC in response to an operation mode being a first operation mode according to an embodiment of the disclosure.

Referring to FIG. 6A, according to various embodiments of the disclosure, arrow A may indicate a signal flow related to the input signal.

The DAC 350 according to an embodiment may include a first DAC 351, the second DAC 352, and an n-th DAC. The n-th DAC indicates an n-th DAC included in the electronic device 300, 'n' may indicate a value less than or equal to the number of DACs included in the electronic device 300, and the value of 'n' may be determined according to the design of the electronic device 300.

The output module 370 according to an embodiment may include a first output module 371, a second output module 372, and an n-th output module. The n-th output module indicates an output module included in the electronic device 300 that is connected to the n-th DAC and outputs an output signal processed by the n-th DAC to the outside, 'n' may indicate a value less than or equal to the number of output modules included in the electronic device 300, and the value of 'n' may be determined according to the design of the electronic device 300.

According to an embodiment of the disclosure, the processor 320 may determine the operation mode to be the first mode (e.g., an active noise cancelling mode) in response to satisfaction of a specified condition (e.g., when active noise cancelling mode is activated, the user wears the electronic device, and information is not received from an external electronic device through the communication module, or when active noise cancelling mode is activated and the electronic device is outside the case (e.g., the case 290 in FIG. 2B)).

According to an embodiment of the disclosure, the processor 320 may obtain input signal A through the input module 310 and the ADC (e.g., the ADC 330 in FIG. 3). For example, the processor 320 may obtain, as input signal A, a digital signal converted by the ADC 330 from an analog signal corresponding to an external sound of the electronic device (e.g., the electronic device 300 in FIG. 3) obtained by the input module 310.

According to an embodiment of the disclosure, the processor 320 may generate first output signal A based on the input signal in response to the operation mode being the first mode. For example, based on the input signal including noise, the processor 320 may generate first output signal A including a destructive interference signal from which the noise signal is to be canceled out. For example, the processor 320 may generate, as first output signal A, an anti-noise signal of inverted phase relative to the noise signal so that the noise signal can be canceled out.

According to an embodiment of the disclosure, for the frequency range of first output signal A generated in response to the first operation mode, if the frequency range reproducible by an output module contains the frequency range of first output signal A, the processor 320 may activate the DAC connected to the corresponding output module, if the frequency range reproducible by an output module does not contain the frequency range of first output signal A, the processor 320 may deactivate the DAC connected to the corresponding output module.

According to an embodiment of the disclosure, in response to the operation mode being the first mode (e.g., an active noise cancelling mode), the processor 320 may transmit first digital output signal A to the first DAC 351 to allow the first output module 371 to output first analog output signal A, and control the DAC 350 to deactivate the second to n-th DACs.

As another example, in response to the operation mode being the first mode (e.g., an active noise cancelling mode), the processor 320 may transmit a first digital output signal lower than the first cutoff (e.g., a signal lower than the first cutoff among signals associated with A) to the first DAC 351 to allow the first output module 371 to output a first analog output signal lower than the first cutoff (e.g., a signal lower than the first cutoff among signals associated with A), transmit a first digital output signal higher than or equal to the first cutoff and lower than the second cutoff (e.g., a signal higher than or equal to the first cutoff and lower than the second cutoff among signals associated with A) to the second DAC 352 to allow the second output module 372 to output a first analog output signal higher than or equal to the first cutoff and lower than the second cutoff (e.g., a signal A higher than or equal to the first cutoff and lower than the second cutoff among signals associated with A), and control the DAC 350 to deactivate the n-th DAC.

Figure 6B:
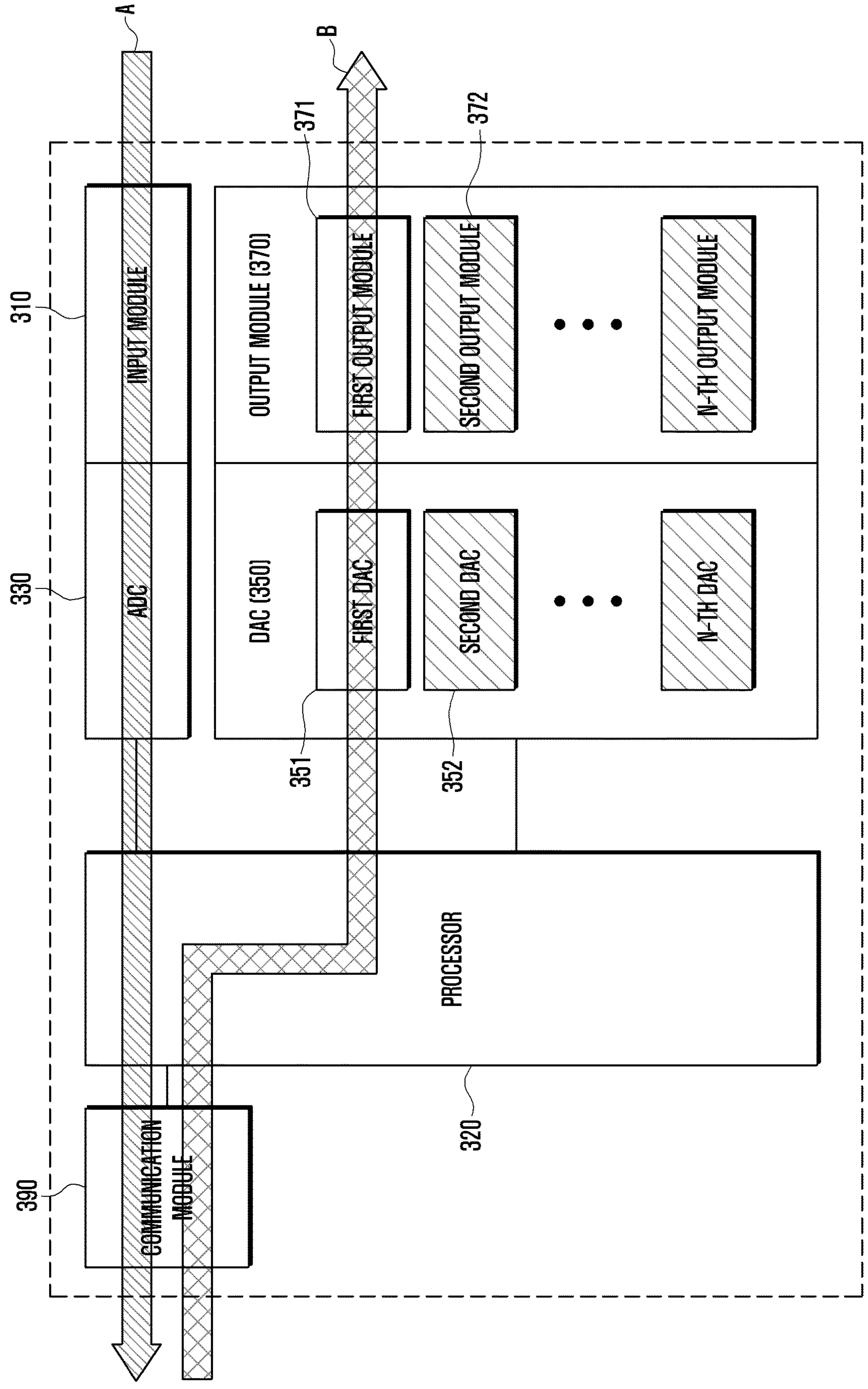

FIG. 6B is a diagram illustrating an operation of a processor to control a DAC in response to an operation mode being a second and/or fourth operation modes according to an embodiment of the disclosure.

Referring to FIG. 6B, according to various embodiments of the disclosure, arrow A may indicate a signal flow related to an input signal, and arrow B may indicate a signal flow related to an external signal.

The DAC 350 according to an embodiment may include the first DAC 351, the second DAC 352, and an n-th DAC. The n-th DAC indicates an n-th DAC included in the electronic device 300, 'n' may indicate a value less than or equal to the number of DACs included in the electronic device 300, and the value of 'n' may be determined according to the design of the electronic device 300.

The output module 370 according to an embodiment may include a first output module 371, a second output module 372, and an n-th output module. The n-th output module indicates an output module included in the electronic device 300 that is connected to the n-th DAC and outputs an output signal processed by the n-th DAC to the outside, 'n' may indicate a value less than or equal to the number of output modules included in the electronic device 300, and the value of 'n' may be determined according to the design of the electronic device 300.

According to an embodiment of the disclosure, the processor 320 may determine the operation mode to be the second mode (e.g., a call mode) in response to receiving information related to the call mode from an external electronic device through the communication module 390. According to another embodiment of the disclosure, the processor 320 may determine the operation mode to be the fourth mode (e.g., a voice guidance mode) in response to obtaining information related to the voice guidance mode from an external electronic device through the communication module 390.

According to an embodiment of the disclosure, the processor 320 may obtain input signal A through the input module 310 and the ADC 330. For example, the processor 320 may obtain, as input signal A, a digital signal converted by the ADC 330 from an analog signal corresponding to an external sound of the electronic device 300 obtained by the input module 310.

According to an embodiment of the disclosure, the processor 320 may obtain external signal B in an audio form from an external electronic device through the communication module 390. For example, in the second mode (e.g., a call mode), the communication module 390 may obtain external signal B corresponding to the voice of a call counterpart from the external electronic device. For example, in the fourth mode (e.g., a voice guidance mode), the communication module 390 may obtain external signal B corresponding to voice guidance from the external electronic device.

The processor 320 according to an embodiment may transmit input signal A obtained through the input module 310 to the external electronic device through the communication module 390. For example, in the second mode (e.g., a call mode), the communication module 390 may transmit input signal A corresponding to a call conversation of the user obtained through the input module 310 to the external electronic device. For example, in the fourth mode (e.g., a voice guidance mode), the communication module 390 may transmit input signal A corresponding to a user's voice command obtained through the input module 310 to the external electronic device.

According to an embodiment of the disclosure, in response to the operation mode being the second mode, the processor 320 may generate second output signal B based on an external signal. For example, the processor 320 may generate second output signal B including a voice signal of the other party of the call obtained through the communication module 390. According to another embodiment of the disclosure, in response to the operation mode being the fourth mode, the processor 320 may generate fourth output signal B based on an external signal. For example, the processor 320 may generate fourth output signal B including a voice guidance signal obtained through the communication module 390.

According to an embodiment of the disclosure, for the frequency range of second output signal B generated in response to the second operation mode, if the frequency range reproducible by an output module contains the frequency range of second output signal B, the processor 320 may activate the DAC connected to the corresponding output module, if the frequency range reproducible by an output module does not contain the frequency range of second output signal B, the processor 320 may deactivate the DAC connected to the corresponding output module.

According to an embodiment of the disclosure, in response to the operation mode being the second mode (e.g., a call mode), the processor 320 may transmit a digital output signal to the first DAC 351 to allow the first output module 371 to output second analog output signal B, and control the DAC 350 to deactivate the second to n-th DACs. According to an embodiment of the disclosure, in response to the operation mode being the fourth mode (e.g., a voice guidance mode), the processor 320 may transmit a digital output signal to the first DAC 351 to allow the first output module 371 to output second analog output signal B, and control the DAC 350 to deactivate the second to n-th DACs.

Figure 6C:
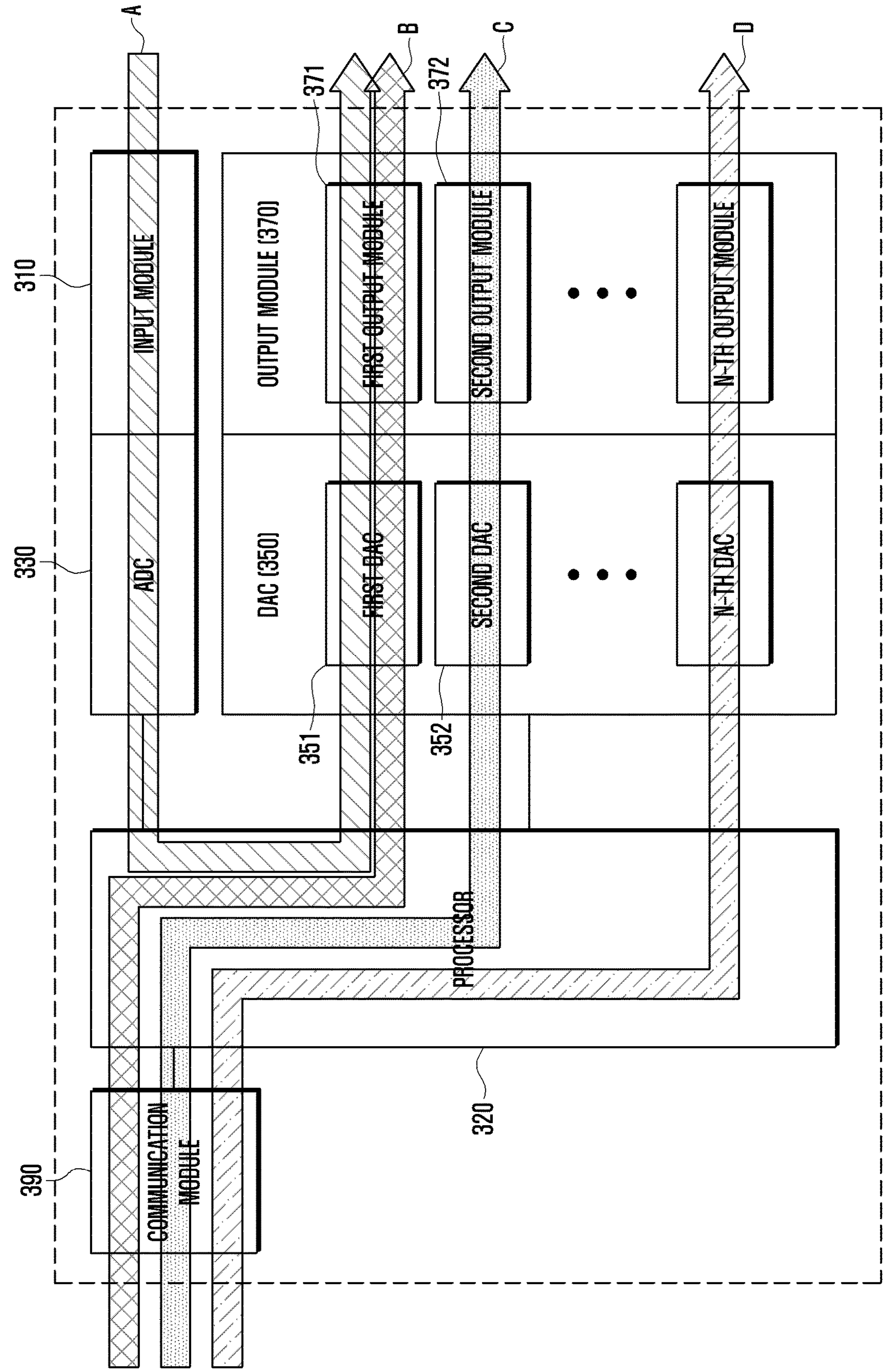

FIG. 6C is a diagram illustrating an operation of a processor to control a DAC in response to an operation mode being a third operation mode according to an embodiment of the disclosure.

Referring to FIG. 6C, according to various embodiments of the disclosure, arrow A may indicate a signal flow related to an input signal, and arrows B, C and D may indicate a signal flow related to an external signal.

The DAC 350 according to an embodiment may include the first DAC 351, the second DAC 352, and an n-th DAC. The n-th DAC indicates an n-th DAC included in the electronic device 300, 'n' may indicate a value less than or equal to the number of DACs included in the electronic device 300, and the value of 'n' may be determined according to the design of the electronic device 300.

The output module 370 according to an embodiment may include a first output module 371, a second output module 372, and an n-th output module. The n-th output module indicates an output module included in the electronic device 300 that is connected to the n-th DAC and outputs an output signal processed by the n-th DAC to the outside, 'n' may indicate a value less than or equal to the number of output modules included in the electronic device 300, and the value of 'n' may be determined according to the design of the electronic device 300.

According to an embodiment of the disclosure, the processor 320 may determine the operation mode to be the third mode (e.g., a multimedia playback mode) in response to obtaining information related to the multimedia playback mode from an external electronic device through the communication module 390.

According to an embodiment of the disclosure, the processor 320 may obtain input signal A through the input module 310 and the ADC 330. For example, the processor 320 may obtain, as input signal A, a digital signal converted by the ADC 330 from an analog signal corresponding to an external sound of the electronic device 300 obtained by the input module 310.

According to an embodiment of the disclosure, the processor 320 may obtain external signal B, C, D in an audio form from the external electronic device through the communication module 390. For example, in the third mode (e.g., a multimedia playback mode), the communication module 390 may obtain external signal B, C, D corresponding to multimedia audio from the external electronic device.

According to an embodiment of the disclosure, in response to the operation mode being the third mode, the processor 320 may generate third output signal A, B, C, D based on input signal A and external signal B, C, D. For example, the processor 320 may generate third output signal A, B, C, D including a destructive interference signal A based on an input signal for cancelling out the input signal, and multimedia audio signal B, C, D obtained through the communication module 390. For example, the processor 320 may generate third output signal A, B, C, D by synthesizing inverted phase signal A of the input signal capable of canceling the output signal and multimedia audio signal B, C, D.

According to an embodiment of the disclosure, for the frequency range of third output signal A, B, C, D generated in response to the third operation mode, if the frequency range reproducible by an output module contains the frequency range of third output signal A, B, C, D, the processor 320 may activate the DAC connected to the corresponding output module, if the frequency range reproducible by an output module does not contain the frequency range of third output signal A, B, C, D, the processor 320 may deactivate the DAC connected to the corresponding output module.

For example, in response to the operation mode being the third mode (e.g., a multimedia playback mode), the processor 320 may transmit third digital output signal A, B lower than the first cutoff to the first DAC 351 to allow the first output module 371 to output third analog output signal A, B lower than the first cutoff, may transmit third digital output signal C higher than or equal to the first cutoff and lower than the second cutoff to the second DAC 352 to allow the second output module 372 to output third analog output signal C higher than or equal to the first cutoff and lower than the second cutoff, and may transmit third digital output signal D higher than or equal to the (n−1)-th cutoff and/or lower than the n-th cutoff, being in the range of a signal that can be processed by the n-th DAC and output by the n-th output module, to the n-th DAC so as to control the DAC 350 to allow the n-th output module to output third analog output signal D higher than or equal to the (n−1)-th cutoff and/or lower than the n-th cutoff.

For example, in response to the operation mode being the third mode (e.g., a multimedia playback mode), the processor 320 may transmit third digital output signal lower than the first cutoff (e.g., a signal lower than the first cutoff among signals associated with A, signal lower than the first cutoff among signals associated with B) to the first DAC 351 to allow the first output module 371 to output third analog output signal lower than the first cutoff (e.g., a signal lower than the first cutoff among signals associated with A, signal lower than the first cutoff among signals associated with B), may transmit third digital output signal C higher than or equal to the first cutoff and lower than the second cutoff (e.g., a signal higher than or equal to the first cutoff and lower than the second cutoff among signals associated with A, signal higher than or equal to the first cutoff and lower than the second cutoff among signals associated with B) to the second DAC 352 to allow the second output module 372 to output third analog output signal C higher than or equal to the first cutoff and lower than the second cutoff (e.g., a signal higher than or equal to the first cutoff and lower than the second cutoff among signals associated with A, signal higher than or equal to the first cutoff and lower than the second cutoff among signals associated with B), and may transmit third digital output signal D higher than or equal to the (n−1)-th cutoff and/or lower than the n-th cutoff to the n-th DAC so as to control the DAC 350 to allow the n-th output module to output third analog output signal D higher than or equal to the (n−1)-th cutoff and/or lower than the n-th cutoff.

Figure 6D:
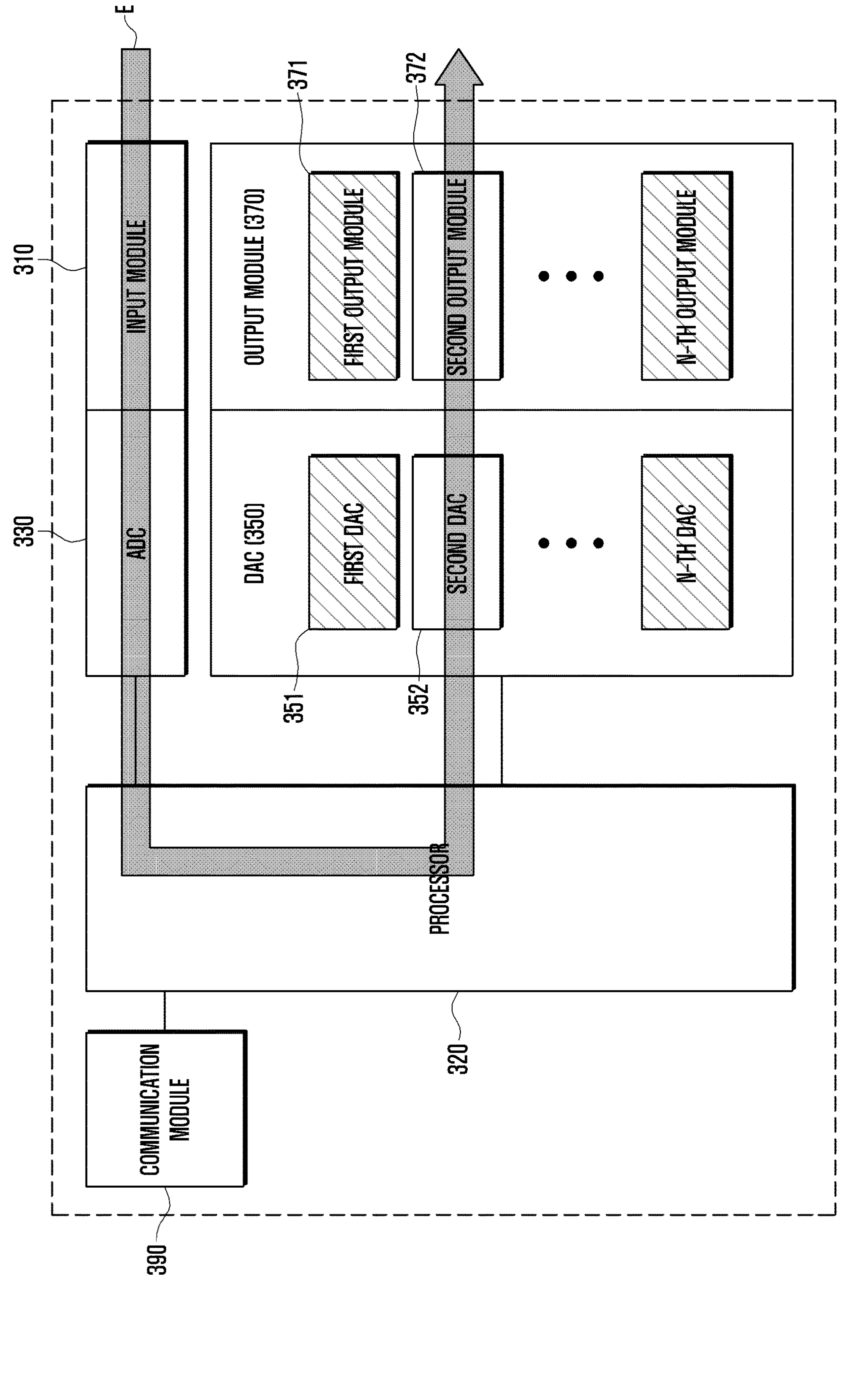

FIG. 6D is a diagram illustrating an operation of a processor to control a DAC in response to an operation mode being fifth operation mode according to an embodiment of the disclosure.

Referring to FIG. 6D, according to various embodiments of the disclosure, arrow E may indicate a signal flow related to an input signal.

The DAC 350 according to an embodiment may include the first DAC 351, the second DAC 352, and an n-th DAC. The n-th DAC indicates an n-th DAC included in the electronic device 300, 'n' may indicate a value less than or equal to the number of DACs included in the electronic device 300, and the value of 'n' may be determined according to the design of the electronic device 300.

The output module 370 according to an embodiment may include a first output module 371, a second output module 372, and an n-th output module. The n-th output module indicates an output module included in the electronic device 300 that is connected to the n-th DAC and outputs an output signal processed by the n-th DAC to the outside, 'n' may indicate a value less than or equal to the number of output modules included in the electronic device 300, and the value of 'n' may be determined according to the design of the electronic device 300.

According to an embodiment of the disclosure, the processor 320 may obtain input signal E through the input module 310 and the ADC 330. For example, the processor 320 may obtain, as input signal E, a digital signal converted by the ADC 330 from an analog signal corresponding to an external sound of the electronic device 300 obtained by the input module 310.

According to an embodiment of the disclosure, the processor 320 may generate fifth output signal E based on the input signal in response to the operation mode being the fifth mode. For example, based on the input signal including noise, the processor 320 may generate fifth output signal E including a destructive interference signal from which the noise signal is to be canceled out. For example, the processor 320 may generate, as fifth output signal E, an anti-noise signal of inverted phase relative to the noise signal so that the noise signal can be canceled out.

According to an embodiment of the disclosure, for the frequency range of fifth output signal E generated in response to the fifth operation mode, if the frequency range reproducible by an output module contains the frequency range of fifth output signal E, the processor 320 may activate the DAC connected to the corresponding output module, if the frequency range reproducible by an output module does not contain the frequency range of fifth output signal E, the processor 320 may deactivate the DAC connected to the corresponding output module.

According to an embodiment of the disclosure, in response to the operation mode being the fifth mode, the processor 320 may transmit a digital output signal to the second DAC 352 to allow the second output module 372 to output fifth analog output signal E, and control the DAC 350 to deactivate the first DAC 351 and the n-th DAC.

According to another embodiment of the disclosure, the processor 320 may obtain an external signal in an audio form (not shown) from an external electronic device through the communication module 390. For example, the processor 320 may obtain an external signal (not shown) corresponding to the audio related to an alarm associated with an occurrence of a specified event from the external electronic device.

For example, in response to the operation mode being the fifth mode, the processor 320 may generate a fifth output signal based on the external signal (not shown). For example, the processor 320 may generate a fifth output signal including an audio signal (not shown) obtained through the communication module 390.

For example, the processor 320 may transmit a digital output signal to the second DAC 352 to allow the second output module 372 to output a fifth analog output signal (not shown), and control the DAC 350 to deactivate the first DAC 351 and the n-th DAC.

Figure 6E:
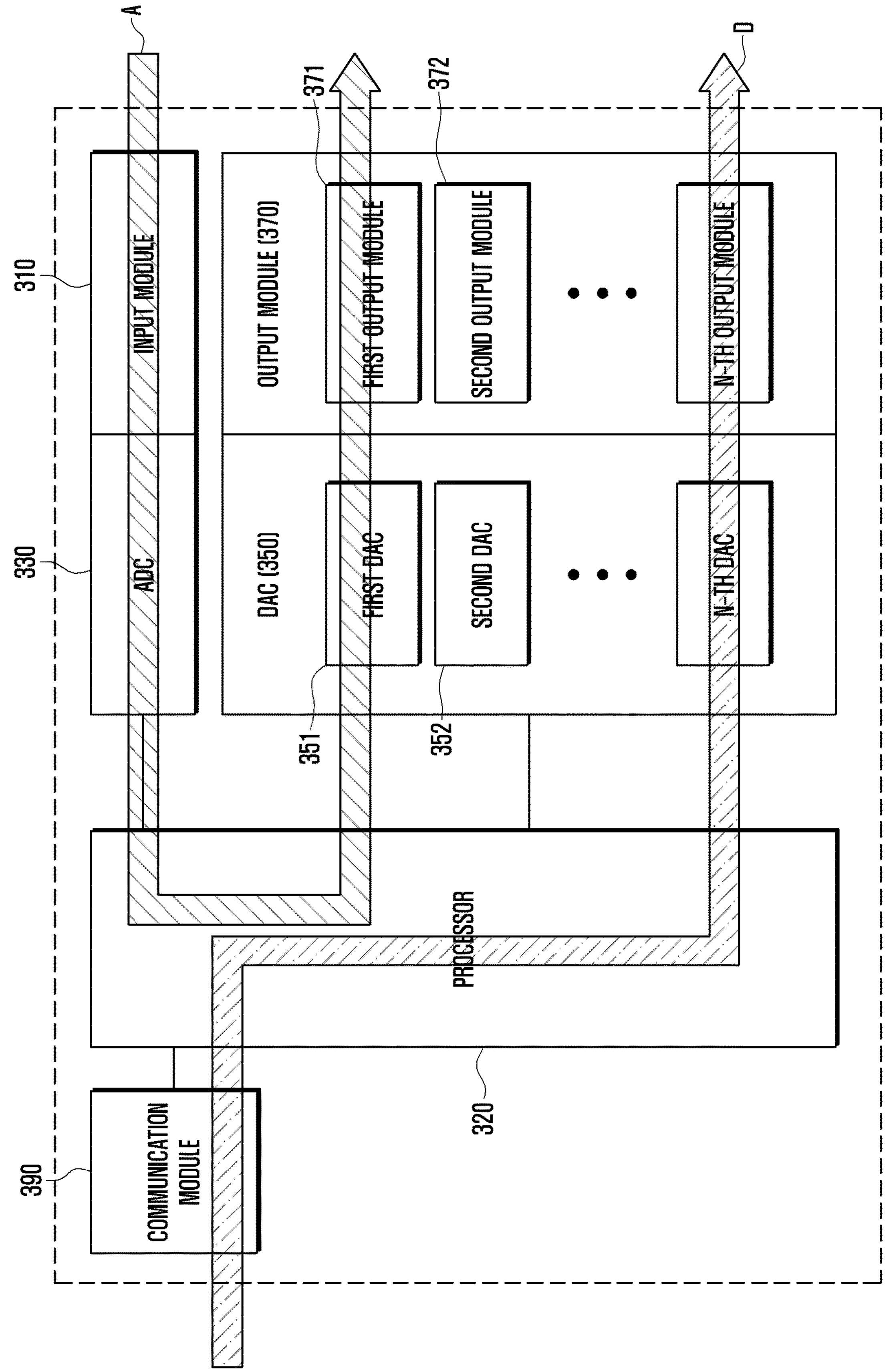

FIG. 6E is a diagram illustrating an operation of a processor to control a DAC in response to an operation mode being sixth operation mode according to an embodiment of the disclosure.

Referring to FIG. 6E, according to various embodiments of the disclosure, arrow A may indicate a signal flow related to an input signal, and arrow D may indicate a signal flow related to an external signal.

The DAC 350 according to an embodiment may include the first DAC 351, the second DAC 352, and an n-th DAC. The n-th DAC indicates an n-th DAC included in the electronic device 300, 'n' may indicate a value less than or equal to the number of DACs included in the electronic device 300, and the value of 'n' may be determined according to the design of the electronic device 300.

The output module 370 according to an embodiment may include a first output module 371, a second output module 372, and an n-th output module. The n-th output module indicates an output module included in the electronic device 300 that is connected to the n-th DAC and outputs an output signal processed by the n-th DAC to the outside, 'n' may indicate a value less than or equal to the number of output modules included in the electronic device 300, and the value of 'n' may be determined according to the design of the electronic device 300.

According to an embodiment of the disclosure, the processor 320 may obtain an input signal through the input module 310 and the ADC 330. For example, the processor 320 may obtain, as input signal A, a digital signal converted by the ADC 330 from an analog signal corresponding to an external sound of the electronic device 300 obtained by the input module 310.

According to an embodiment of the disclosure, in the sixth mode, the communication module 390 may obtain external signal D from an external electronic device. For example, the processor 320 may obtain external signal D corresponding to the audio related to an alarm associated with an occurrence of a specified event from the external electronic device.

According to an embodiment of the disclosure, in response to the operation mode being the sixth mode, the processor 320 may generate sixth output signal A, D based on input signal A and external signal D. For example, based on input signal A, the processor 320 may generate a sixth output signal including a destructive interference wave from which input signal A is to be canceled out, and external signal D obtained through the communication module 390. For example, the processor 320 may generate sixth output signal A, D by synthesizing an inverted phase signal of the input signal capable of canceling the output signal, and the external signal.

According to an embodiment of the disclosure, for the frequency range of sixth output signal A, D generated in response to the sixth mode, if the frequency range reproducible by an output module contains the frequency range of sixth output signal A, D, the processor 320 may activate the DAC connected to the corresponding output module, if the frequency range reproducible by an output module does not contain the frequency range of sixth output signal A, D, the processor 320 may deactivate the DAC connected to the corresponding output module.

For example, in response to the operation mode being the sixth mode, the processor 320 may transmit sixth digital output signal A lower than the first cutoff to the first DAC 351 to allow the first output module 371 to output sixth analog output signal A lower than the first cutoff, and may transmit sixth digital output signal D higher than or equal to the (n−1)-th cutoff and/or lower than the n-th cutoff to the n-th DAC so as to control the DAC 350 to allow the n-th output module to output sixth analog output signal D higher than or equal to the (n−1)-th cutoff and/or lower than the n-th cutoff.

Figure 7A:
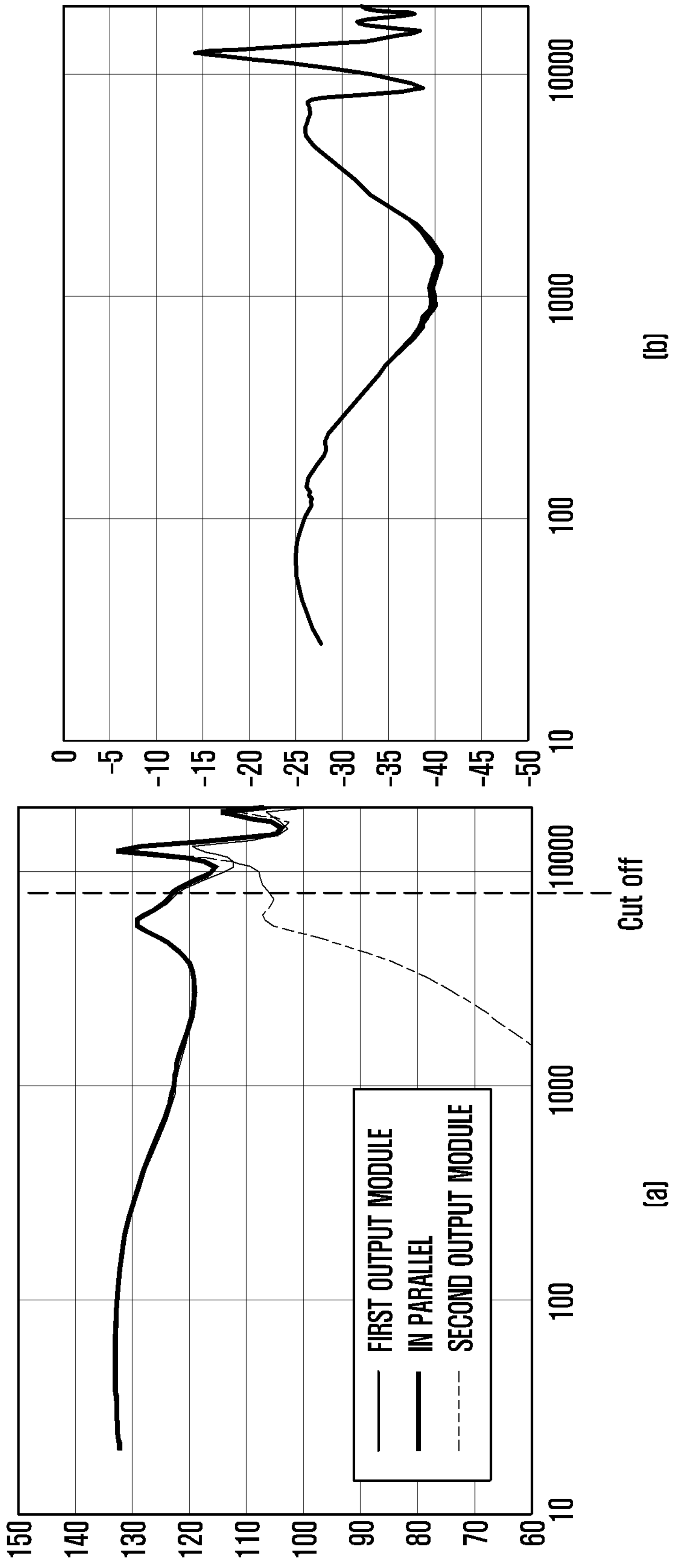
FIGS. 7A and 7B are diagrams illustrating experimental data for an electronic device including a first output module and a second output module according to various embodiments of the disclosure.
Figure 7B:
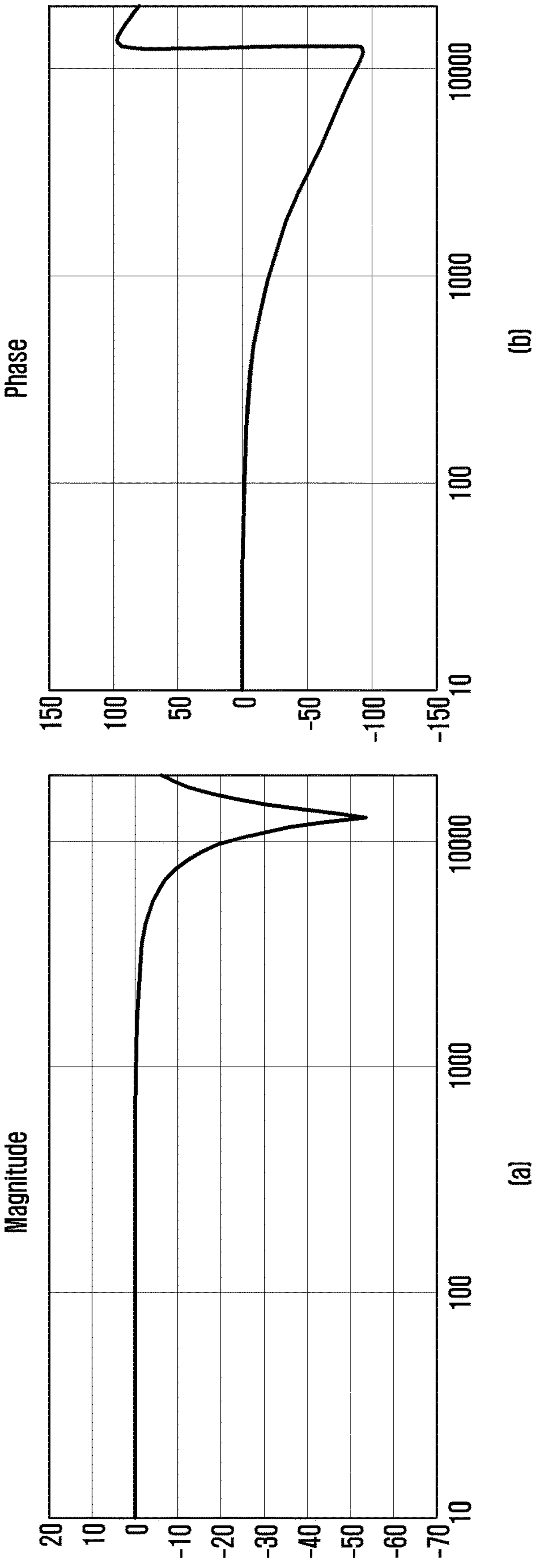

FIGS. 7A and 7B are diagrams illustrating experimental data for an electronic device including a first output module and a second output module according to various embodiments of the disclosure.

Referring to part (a) of FIG. 7A, a graph illustrates a frequency response of a speaker along the frequency band in the electronic device 300 in which the first output module 371 and the second output module 372 are configured in parallel. Referring to the graph in part (a) of FIG. 7A, it can be seen that a peak occurs at a frequency of about 10 kHz in the frequency response characteristic of the second output module.

Referring to part (b) of FIG. 7A, a graph illustrates a frequency response of a feedback speaker (not shown) along the frequency band in the electronic device 300 in which the first output module 371 and the second output module 372 are configured in parallel. Referring to the graph in part (b) of FIG. 7A, it can be seen that a peak occurs at a frequency of about 10 KHz.

In the active noise canceling (ANC) function, the flatter the graph of the speaker response along the frequency, the better the operation function may be. Therefore, it may be important for the electronic device 300 to remove the peak occurring as shown in the graphs in parts (a) and (b) of FIG. 7A.

In general, a filter, such as a notch filter may be applied to a signal to remove a peak of frequencies.

When a filter for removing peaks is applied, part (a) of FIG. 7B is a graph illustrating a change in frequency magnitude, and part (b) of FIG. 7B is a graph illustrating a change in phase. For the approximately 2 kHz section mainly used in the ANC function, it can be seen that there is no change in the frequency magnitude referring to the graph in part (a) of FIG. 7B but a change in phase occurs referring to the graph in part (b) of FIG. 7B.

In other words, when the electronic device 300 applies a filter to a signal to remove a peak, a phase difference may occur in the ANC function, and the ANC function may be deteriorated correspondingly.

Accordingly, when using the ANC function as in the electronic device 300 proposed in various embodiments of the disclosure, by separating the second output module 372 that which outputs a frequency range of about 10 kHz or more where peaks mainly occurs, and using only the first output module 371 for the 2 kHz section mainly used in the ANC function, it is possible to eliminate the cause of peak occurrence, and prevent ANC function degradation due to peak occurrence and filter application.

The electronic device 300 according to various embodiments may include the communication module 390, the input module 310, the first output module 371, the second output module 372, the first DAC 351 connected to the first output module 371, the second DAC 352 connected to the second output module 372, and the processor 320, wherein the processor 320 may be configured to identify an operation mode of the electronic device 300, obtain an external signal through the communication module 390, or obtain an input signal through the input module 310, generate an output signal corresponding to the operation mode, and control the first DAC 351 and the second DAC 352 in response to the operation mode.

In the electronic device 300 according to various embodiments of the disclosure, the first output module 371 may output an output signal corresponding to a frequency less than a first cutoff value, and the second output module 372 may output an output signal corresponding to a frequency greater than or equal to the first cutoff value.

In the electronic device 300 according to various embodiments of the disclosure, in response to the operation mode being a first operation mode, the processor 320 may be configured to generate a first output signal, control the first DAC 351 to output the first output signal through the first output module 371, and deactivate the second DAC 352.

In the electronic device 300 according to various embodiments of the disclosure, the first operation mode may be an active noise canceling mode, the input signal may include a signal corresponding to an external sound of the electronic device 300, and the processor 320 may be configured to generate the first output signal based on the input signal.

In the electronic device 300 according to various embodiments of the disclosure, the first operation mode may be a call mode, the external signal may include a signal corresponding to a voice of the other party of a call, and the processor 320 may be configured to generate the first output signal based on the external signal.

In the electronic device 300 according to various embodiments of the disclosure, the first operation mode may be a voice guidance mode, the external signal may include a signal corresponding to a guidance voice, and the processor 320 may be configured to generate the first output signal based on the external signal obtained through the communication module 390.

In the electronic device 300 according to various embodiments of the disclosure, in response to the operation mode being a second operation mode, the processor 320 may be configured to generate a second output signal, control the first DAC 351 to output the second output signal lower than the first cutoff value through the first output module 371, and control the second DAC 352 to output the second output signal higher than or equal to the first cutoff value through the second output module 372.

In the electronic device 300 according to various embodiments of the disclosure, the second operation mode is a multimedia playback mode, the input signal may include a signal corresponding to an external sound of the electronic device 300, the external signal may include a signal corresponding to multimedia audio, and the processor 320 may be configured to generate the second output signal based on the input signal and the external signal.

In the electronic device 300 according to various embodiments of the disclosure, the electronic device 300 may further include a third output module and a third DAC connected to the third output module, the second output module 372 may output an output signal corresponding to a frequency higher than or equal to the first cutoff value and lower than a second cutoff value, and the third output module may output an output signal corresponding to a frequency higher than or equal to the second cutoff value.

In the electronic device 300 according to various embodiments of the disclosure, in response to the operation mode being a third operation mode, the processor 320 may be configured to generate a third output signal, control the second DAC 352 to output the third output signal through the second output module 372, and deactivate the first DAC 351 and the third DAC.

In the electronic device 300 according to various embodiments of the disclosure, in response to the operation mode being a fourth operation mode, the processor 320 may be configured to generate a fourth output signal, control the first DAC 351 to output the fourth output signal lower than the first cutoff value through the first output module 371, control the third DAC to output the fourth output signal higher than or equal to the second cutoff value through the third output module, and deactivate the second DAC 352.

A method of operating the electronic device 300 according to various embodiments of the disclosure may include identifying the operation mode of the electronic device 300, obtaining an external signal through a communication module 390 or obtaining an input signal through an input module 310, generating an output signal corresponding to the operation mode, and controlling the first DAC 351 connected to the first output module 371 and the second DAC 352 connected to the second output module 372 in response to the operation mode.

In the method of operating the electronic device 300 according to various embodiments of the disclosure, in response to the operation mode being a first operation mode, the method may include generating a first output signal, controlling the first DAC 351 to output the first output signal through the first output module 371, and deactivating the second DAC 352.

In the method of operating the electronic device 300 according to various embodiments of the disclosure, the first operation mode may be an active noise canceling mode, the input signal may include a signal corresponding to an external sound of the electronic device 300, and the method may include generating the first output signal based on the input signal.

In the method of operating the electronic device 300 according to various embodiments of the disclosure, the first operation mode may be a call mode, the external signal may include a signal corresponding to a voice of the other party of a call, and the method may include generating the first output signal based on the external signal.

In the method of operating the electronic device 300 according to various embodiments of the disclosure, the first operation mode may be a voice guidance mode, the external signal may include a signal corresponding to a guidance voice, and the method may include generating the first output signal based on the external signal obtained through the communication module 390.

In the method of operating the electronic device 300 according to various embodiments of the disclosure, in response to the operation mode being a second operation mode, the method may include generating a second output signal, controlling the first DAC 351 to output the second output signal lower than a first cutoff value through the first output module 371, and controlling the second DAC 352 to output the second output signal higher than or equal to the first cutoff value through the second output module 372.

In the method of operating the electronic device 300 according to various embodiments of the disclosure, the second operation mode is a multimedia playback mode, the input signal may include a signal corresponding to an external sound of the electronic device 300, the external signal may include a signal corresponding to multimedia audio, and the method may include generating the second output signal based on the input signal and the external signal.

In the method of operating the electronic device 300 according to various embodiments of the disclosure, in response to the operation mode being a third operation mode, the method may include generating a third output signal, controlling the second DAC 352 to output the third output signal through the second output module 372, and deactivating the first DAC 351 and a third DAC connected to a third output module.

In the method of operating the electronic device 300 according to various embodiments of the disclosure, in response to the operation mode being a fourth operation mode, the method may include generating a fourth output signal, controlling the first DAC 351 to output the fourth output signal lower than the first cutoff value through the first output module 371, controlling the third DAC to output the fourth output signal higher than or equal to a second cutoff value through the third output module, and deactivating the second DAC 352.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication module;
an input module;
a first output module;
a second output module;
a first digital to analog converter (DAC) connected to the first output module;
a second DAC connected to the second output module;
memory storing one or more computer programs; and
at least one processor,
wherein the one or more computer programs include computer-executable instructions that, when executed by the at least one processor individually or collectively, cause the electronic device to:
identify an operation mode of the electronic device among a plurality of different operation modes of the electronic device,
obtain an external signal through the communication module, or obtain an input signal through the input module,
generate, based on the external signal or the input signal, an output signal corresponding to the identified operation mode, and
control the first DAC and the second DAC in response to the identified operation mode, and
wherein in at least one operation mode of the electronic device among the plurality of different operation modes of the electronic device, at least one of the first DAC or the second DAC is deactivated.

2. The electronic device of claim 1,
wherein the first output module is configured to output an output signal corresponding to a frequency lower than a first cutoff value, and
wherein the second output module is configured to output an output signal corresponding to a frequency higher than or equal to the first cutoff value.

3. The electronic device of claim 2, wherein the one or more computer programs further include computer-executable instructions that, when executed by the at least one processor individually or collectively, cause the electronic device, in response to the identified operation mode being a first operation mode, to:
generate a first output signal,
control the first DAC to output the first output signal through the first output module, and
deactivate the second DAC.

4. The electronic device of claim 3,
wherein the one or more computer programs further include computer-executable instructions that, when executed by the at least one processor individually or collectively, cause the electronic device to;
generate the first output signal based on the input signal,
wherein the first operation mode is an active noise canceling mode, and
wherein the input signal includes a signal corresponding to an external sound of the electronic device.

5. The electronic device of claim 3,
wherein the one or more computer programs further include computer-executable instructions that, when executed by the at least one processor individually or collectively, cause the electronic device to:
generate the first output signal based on the external signal,
wherein the first operation mode is a call mode, and
wherein the external signal includes a signal corresponding to a voice of other party of a call.

6. The electronic device of claim 3,
wherein the one or more computer programs further include computer-executable instructions that, when executed by the at least one processor individually or collectively, cause the electronic device to;
generate the first output signal based on the external signal obtained through the communication module,
wherein the first operation mode is a voice guidance mode, and
wherein the external signal includes a signal corresponding to a guidance speech.

7. The electronic device of claim 2, wherein the one or more computer programs further include computer-executable instructions that, when executed by the at least one processor individually or collectively, cause the electronic device, in response to the identified operation mode being a second operation mode, to:
generate a second output signal,
control the first DAC to output the second output signal lower than the first cutoff value through the first output module, and
control the second DAC to output the second output signal higher than or equal to the first cutoff value through the second output module.

8. The electronic device of claim 7,
wherein the one or more computer programs further include computer-executable instructions that, when executed by the at least one processor individually or collectively, cause the electronic device to;
generate the second output signal based on the input signal and the external signal,
wherein the second operation mode is a multimedia play back mode,
wherein the input signal includes a signal corresponding to an external sound of the electronic device, and
wherein the external signal includes a signal corresponding to multimedia audio.

9. The electronic device of claim 2, further comprising:
a third output module; and
a third DAC connected to the third output module,
wherein the second output module is configured to output an output signal corresponding to a frequency higher than or equal to the first cutoff value and lower than a second cutoff value, and
wherein the third output module is configured to output an output signal corresponding to a frequency higher than or equal to the second cutoff value.

10. The electronic device of claim 9, wherein the one or more computer programs further include computer-executable instructions that, when executed by the at least one processor individually or collectively, cause the electronic device, in response to the identified operation mode being a third operation mode, to:

generate a third output signal, control the second DAC to output the third output signal through the second output module, and deactivate the first DAC and the third DAC.

11. The electronic device of claim 9, wherein the one or more computer programs further include computer-executable instructions that, when executed by the at least one processor individually or collectively, cause the electronic device, in response to the identified operation mode being a fourth operation mode, to:

generate a fourth output signal, control the first DAC to output the fourth output signal lower than the first cutoff value through the first output module, control the third DAC to output the fourth output signal higher than or equal to the second cutoff value through the third output module, and deactivate the second DAC.

12. A method performed by an electronic device, the method comprising:

identifying an operation mode of the electronic device among a plurality of different operation modes of the electronic device;

obtaining an external signal through a communication module or obtaining an input signal through an input module;

generating, based on the external signal or the input signal, an output signal corresponding to the identified operation mode; and controlling a first digital to analog converter (DAC) connected to a first output module and a second DAC connected to a second output module in response to the identified operation mode, wherein in at least one operation mode of the electronic device among the plurality of different operation modes of the electronic device, at least one of the first DAC or the second DAC is deactivated.

13. The method of claim 12, further comprising, in response to the identified operation mode being a first operation mode:

generating a first output signal;

controlling the first DAC to output the first output signal through the first output module; and deactivating the second DAC.

14. The method of claim 13, further comprising:

generating the first output signal based on the input signal, wherein the first operation mode is an active noise canceling mode, and wherein the input signal includes a signal corresponding to an external sound of the electronic device.

15. The method of claim 13, further comprising:

generating the first output signal based on the external signal, wherein the first operation mode is a call mode, and wherein the external signal includes a signal corresponding to a voice of other party of a call.

16. The method of claim 13, further comprising:

generating the first output signal based on the external signal obtained through the communication module, wherein the first operation mode is a voice guidance mode, and wherein the external signal includes a signal corresponding to a guidance speech.

17. The method of claim 12, further comprising, in response to the identified operation mode being a second operation mode:

generating a second output signal;

controlling the first DAC to output the second output signal lower than a first cutoff value through the first output module; and controlling the second DAC to output the second output signal higher than or equal to the first cutoff value through the second output module.

18. The method of claim 17, further comprising:

generating the second output signal based on the input signal and the external signal, wherein the second operation mode is a multimedia playback mode, wherein the input signal includes a signal corresponding to an external sound of the electronic device, and wherein the external signal includes a signal corresponding to multimedia audio.

19. The method of claim 12, further comprising, in response to the identified operation mode being a third operation mode:

generating a third output signal;

controlling the second DAC to output the third output signal through the second output module; and deactivating the first DAC and a third DAC connected to a third output module.

20. The method of claim 19, further comprising, in response to the identified operation mode being a fourth operation mode:

generating a fourth output signal;

controlling the first DAC to output the fourth output signal lower than a first cutoff value through the first output module;

controlling the third DAC to output the fourth output signal higher than or equal to a second cutoff value through the third output module; and deactivating the second DAC.

21. The method of claim 12, wherein the first output module is configured to output an output signal corresponding to a frequency lower than a first cutoff value, and wherein the second output module is configured to output an output signal corresponding to a frequency higher than or equal to the first cutoff value.

22. The method of claim 19, wherein the second output module is configured to output an output signal corresponding to a frequency higher than or equal to a first cutoff value and lower than a second cutoff value, and wherein the third output module is configured to output an output signal corresponding to a frequency higher than or equal to the second cutoff value.

* * * * *